US012561001B2

(12) United States Patent
Hochberg et al.

(10) Patent No.: US 12,561,001 B2
(45) Date of Patent: Feb. 24, 2026

(54) HIGH ACCURACY SELECTION OF ELEMENTS OF GROUPS USING A BRAIN MACHINE INTERFACE (BMI)

(71) Applicants: BROWN UNIVERSITY, Providence, RI (US); THE GENERAL HOSPITAL CORPORATION, Boston, MA (US); The United States Government as Represented by the Department of Veterans Affairs, Washington, DC (US)

(72) Inventors: Leigh Hochberg, Brookline, MA (US); Stefan Eduardo Lütschg Espinosa, Providence, RI (US); Thomas Hosman, Providence, RI (US); David Rosler, Providence, RI (US); John D. Simeral, East Greenwich, RI (US); Carlos Vargas-Irwin, Providence, RI (US); Natalie Herrick, Providence, RI (US)

(73) Assignees: BROWN UNIVERSITY, Providence, RI (US); THE GENERAL HOSPITAL CORPORATION, Boston, MA (US); THE UNITED STATES GOVERNMENT AS REPRESENTED BY THE DEPARTMENT OF VETERANS AFFAIRS, Washington, DC (US)

( * ) Notice: Subject to any disclaimer, the term of this patent is extended or adjusted under 35 U.S.C. 154(b) by 0 days.

(21) Appl. No.: 18/947,556

(22) Filed: Nov. 14, 2024

(65) Prior Publication Data

US 2025/0155977 A1 May 15, 2025

Related U.S. Application Data

(60) Provisional application No. 63/598,842, filed on Nov. 14, 2023.

(51) Int. Cl.
*G06F 3/01* (2006.01)
*G06F 3/0482* (2013.01)

(52) U.S. Cl.
CPC .............. *G06F 3/015* (2013.01); *G06F 3/017* (2013.01); *G06F 3/0482* (2013.01)

(58) Field of Classification Search
CPC ......... G06F 3/015; G06F 3/017; G06F 3/0482
(Continued)

(56) References Cited

U.S. PATENT DOCUMENTS

| | | | |
|---|---|---|---|
| 12,352,976 B1 * | 7/2025 | Oskui .................... | H04R 1/403 |
| 2020/0064444 A1 * | 2/2020 | Regani .................... | G01S 7/006 |

(Continued)

*Primary Examiner* — Calvin C Ma
(74) *Attorney, Agent, or Firm* — Tarolli, Sundheim, Covell & Tummino LLP

(57) ABSTRACT

High accuracy selections of grouped elements can be achieved using a brain machine interface. A neural decoding system can: receive a neural signal from a neural recording device, identify that the neural signal is representative of the user at least thinking of attempting to perform a gesture, which is one of a plurality of known gestures mapped to a plurality of commands, and output a command based on the gesture (the gesture is mapped to the command). A controller can be in communication with the neural decoding system and a display. The controller can: receive the command, if the gesture is a primary gesture, then select a group to be an active group of elements, if the gesture is a secondary gesture, then at least select an element of the active group of elements and output a response indicative of the group being activated and/or the element being selected.

20 Claims, 13 Drawing Sheets

(58) Field of Classification Search
USPC .......................................................... 345/156
See application file for complete search history.

(56) References Cited

U.S. PATENT DOCUMENTS

2023/0176658 A1 *    6/2023   Lee .......................... G06F 3/167
                                                                              345/156
2024/0053825 A1 *    2/2024   Baber ...................... G06F 3/015

* cited by examiner

Figure 1:
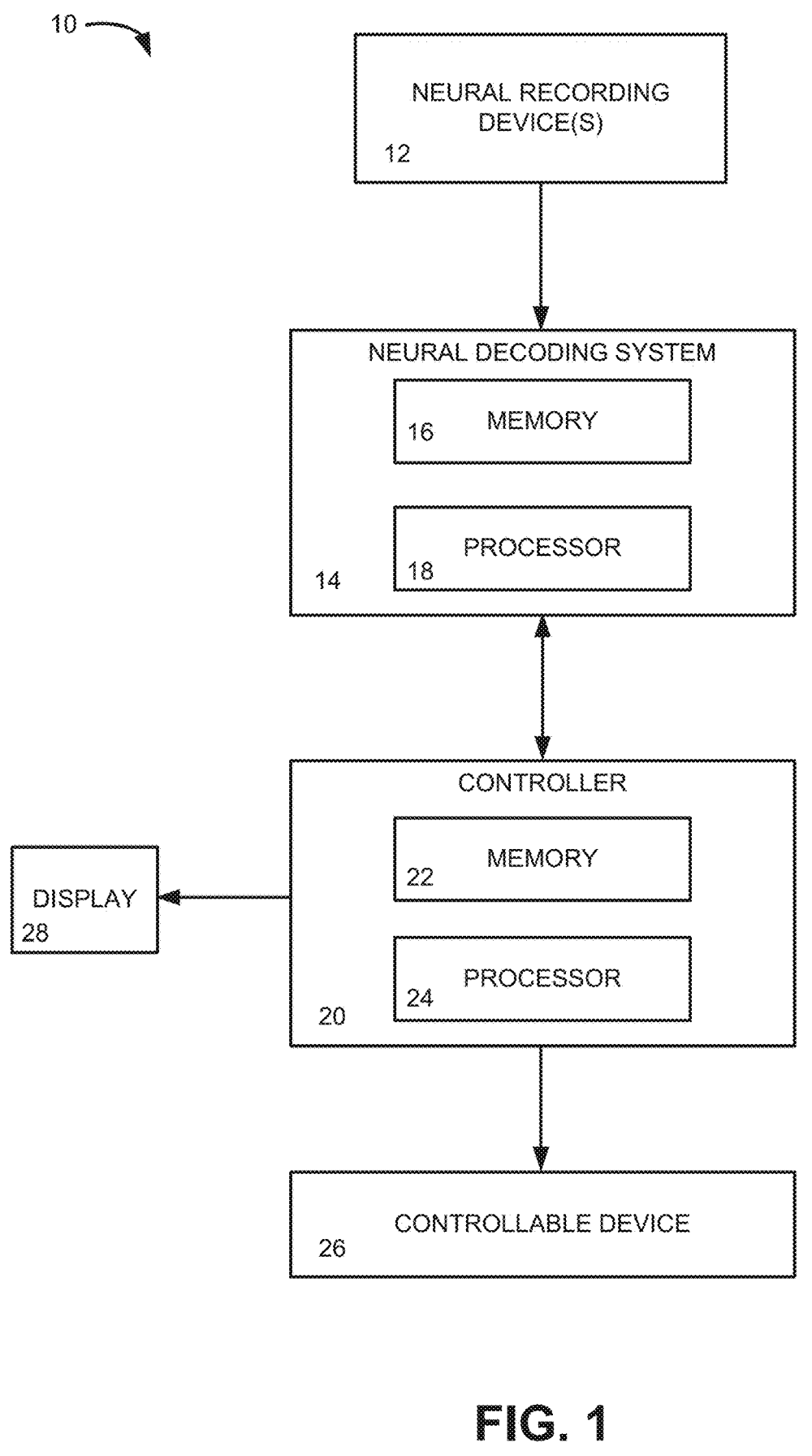

10

NEURAL RECORDING
DEVICE(S)
12

NEURAL DECODING SYSTEM

MEMORY
16

PROCESSOR
18

14

CONTROLLER

MEMORY
22

DISPLAY
28

PROCESSOR
24

20

CONTROLLABLE DEVICE
26

VISUALIZE ON A DISPLAY DEVICE A DEPICTION OF ONE OR MORE GROUPS OF ELEMENTS

72

RECEIVE A COMMAND REPRESENTING A PRIMARY GESTURE OR A SECONDARY GESTURE

74

PRIMARY                                    SECONDARY

ACTIVATE A GROUP OF THE ONE OR MORE GROUPS OF ELEMENTS 76-a

SELECT AN ELEMENT OF AN ALREADY ACTIVE GROUP 76-b

OUTPUT A RESPONSE INDIVATIVE OF THE ACIVATION/ SELECTION

78

80

RECEIVE AT LEAST ONE NEURAL SIGNAL FROM A NEURAL RECORDING DEVICE
82

IDENTIFY THAT THE AT LEAST ONE NEURAL SIGNAL IS REPRESENTATIVE OF THE USER AT LEAST THINKING OF ATTEMPTING TO PERFORM A KNOWN GESTURE MAPPED TO A COMMAND
84

OUTPUT THE COMMAND REPRESENTING A PRIMARY GESTURE OR A SECONDARY GESTURE
86

Decoder Pipeline

HIGH ACCURACY SELECTION OF ELEMENTS OF GROUPS USING A BRAIN MACHINE INTERFACE (BMI)

CROSS-REFERENCE TO RELATED APPLICATIONS

This application claims the benefit of U.S. Provisional Application Ser. No. 63/598,842, filed 14 Nov. 2023, entitled "NOVEL METHOD FOR ACHIEVING HIGH ACCURACY TYPING ON A VIRTUAL KEYBOARD USING AN INTRACORTICAL BRAIN COMPUTER INTERFACE". The entirety of this application is incorporated by reference for all purposes.

GOVERNMENTAL FUNDING STATEMENT

This invention was made with government support under grant number U01 DC017844, awarded by the National Institutes of Health, and grant numbers A4820R, N3864-C and A2295-R awarded by the U.S. Department of Veteran Affairs. The government has certain rights in the invention.

TECHNICAL FIELD

The present disclosure relates generally to using a brain-machine interface (BMI) and, more specifically, to systems and methods for achieving high accuracy selections of grouped elements using the BMI.

BACKGROUND

Able-bodied individuals use various finger motions to communicate and interact with devices in all aspects of life. For example, typing on a computer, phone, or tablet, playing an instrument, pressing buttons (real or virtual) on appliances like a microwave, oven, or tv remote, or the like. However, disabled or motor control impaired individuals often lack complete volitional control of the hands and/or fingers, causing these "simple" tasks to be complicated or impossible. In some instances, individuals, such as those suffering from the effects of spinal cord injury (SCI), bulbar stroke, or the like, can circumvent the lack of volitional control of the hands and/or fingers through the use of commercial speech-to-text products, eye tracking devices, and the like. However, other individuals cannot or are unable to use products, such as those suffering from advanced cases of Amyotrophic Lateral Sclerosis (ALS) where speech-to-text communication is impossible and the possibility of using eye-tracking technology degrades over time. Brain-machine interfaces (BMI) can improve assistive communication and interaction options for disabled individuals, even those affected by severe motor impairments like ALS, by leveraging brain signals (the activity of single neurons or populations of neurons) to enable the control of computers and other electrical devices external to the body. However, BMIs are often slow and imprecise when it comes to selecting individual elements from a group of elements.

SUMMARY

The present disclosure illustrates systems and methods for achieving high accuracy selections of grouped elements using a brain-machine interface (BMI). The systems and methods described herein can improve assistive communication and interaction options for individuals, including disabled individuals.

Described herein is a system of high-accuracy selection of a group and/or an element from the group. The system includes a neural decoding system comprising a non-transitory memory storing instructions and a processor to execute the instructions to: receive at least one neural signal of a user from at least one neural recording device, identify that the at least one neural signal of the user is representative of the user at least thinking of attempting to perform a gesture, wherein the gesture is one of a plurality of known gestures mapped to a plurality of commands, and output a command of the plurality of commands based on the gesture, wherein the gesture is mapped to the command. The system also includes a controller in communication with the neural decoding system and a display configured to visualize a depiction of one or more groups of elements, wherein each of the one or more groups comprises one or more elements, wherein the controller comprises another non-transitory memory storing instructions, and another processor to execute the instructions to: receive the command associated with the gesture from the neural decoding system, if the gesture is a primary gesture, then the command associated with the primary gesture selects a group of the one or more groups of elements to be an active group of elements, if the gesture is a secondary gesture, then the command associated with the secondary gesture at least selects an element of the active group of elements, wherein the secondary gesture is different from the primary gesture, and output a response indicative of the active group of elements being activated and/or the element of the active group of elements being selected.

Also described herein is a method for high-accuracy selection of a group and/or an element from the group. The method can be executed by a system comprising a processor and includes the steps of visualizing on a display device a depiction of one or more groups of elements, wherein each of the one or more groups comprises one or more elements; receiving a command from a neural decoding system, wherein the command is based on the neural decoding system identifying at least one neural signal of the user that is representative of the user at least thinking of attempting to perform a gesture, wherein the command is associated with a primary gesture or a secondary gesture; if the gesture is the primary gesture, selecting a group of the one or more groups of elements to be an active group of elements; if the gesture is a secondary gesture, selecting an element of the active group of elements, wherein the secondary gesture is different from the primary gesture, and outputting a response indicative of the active group of elements being activated and/or the element of the active group of elements being selected.

BRIEF DESCRIPTION OF THE DRAWINGS

The foregoing and other features of the present disclosure will become apparent to those skilled in the art to which the present disclosure relates upon reading the following description with reference to the accompanying drawings, in which:

FIG. 1 is an illustration of a system for achieving high accuracy selections of grouped elements using a brain machine interface (BMI);

DETAILED DESCRIPTION

I. Definitions

Figure 2:
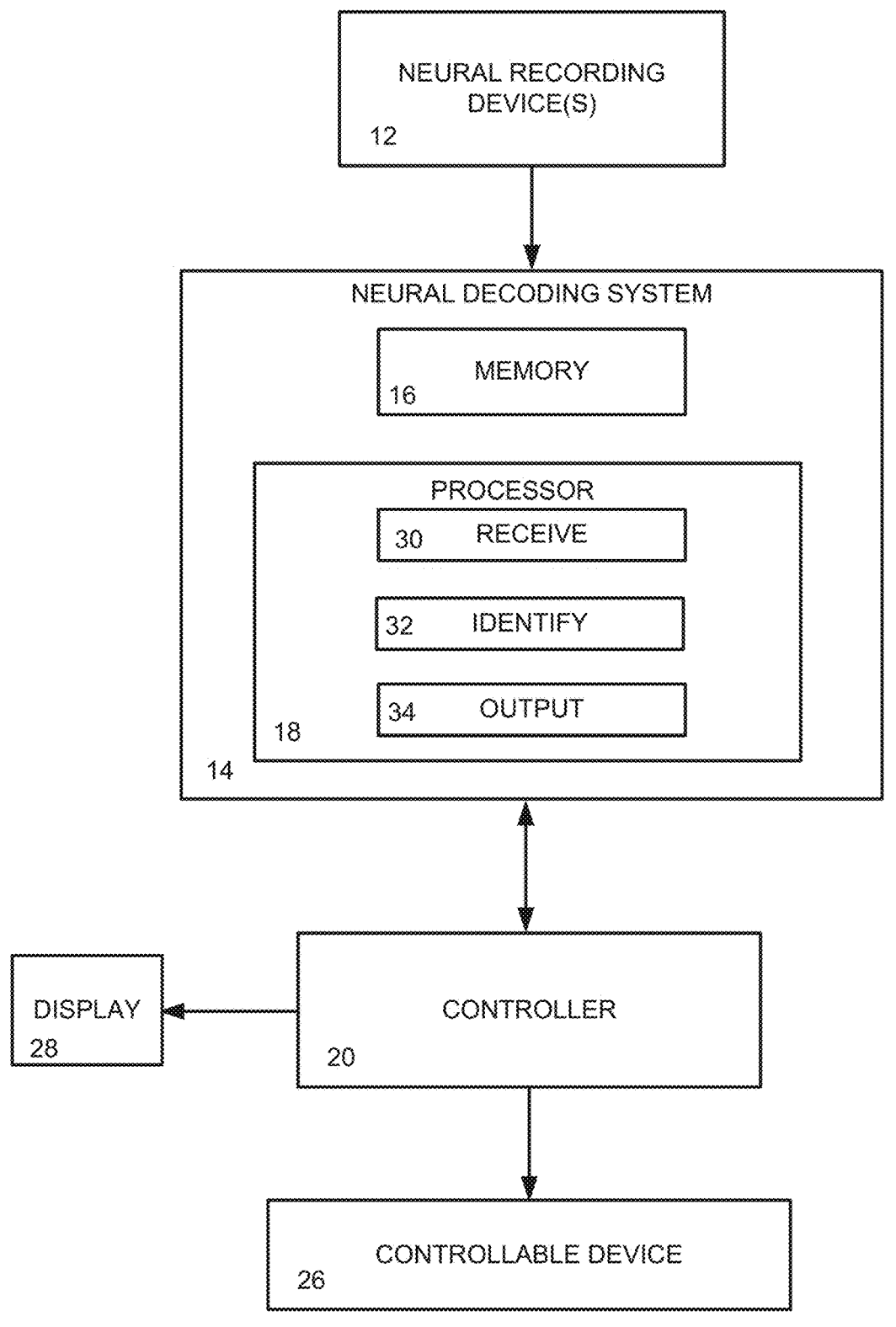
FIGS. 2 and 3 are illustrations of various components of the system of FIG. 1.

Unless otherwise defined, all technical terms used herein have the same meaning as commonly understood by one of ordinary skill in the art to which the present disclosure pertains.

As used herein, the singular forms "a," "an," and "the" can also include the plural forms, unless the context clearly indicates otherwise.

As used herein, the terms "comprises" and/or "comprising," can specify the presence of stated features, steps, operations, elements, and/or components, but do not preclude the presence or addition of one or more other features, steps, operations, elements, components, and/or groups.

As used herein, the term "and/or" can include any and all combinations of one or more of the associated listed items.

As used herein, the terms "first," "second," etc. should not limit the elements being described by these terms. These terms are only used to distinguish one element from another. Thus, a "first" element discussed below could also be termed a "second" element without departing from the teachings of the present disclosure. The sequence of operations (or acts/steps) is not limited to the order presented in the claims or figures unless specifically indicated otherwise.

As used herein, the term "selection" can refer to a choice of an element within one or more groups of elements (each group includes one or more elements). A user of a BMI can make the selection of an element within the one or more groups of elements in an intuitive manner (e.g., in with thoughts of gestures and/or postures similar to physical movements that would traditionally lead to such a result), and at least an aspect of a controllable device can be controlled based on the selected element. For example, the mental control can be based on a thought and/or intention to perform a motion, gesture, and/or posture that an able-bodied individual would traditionally perform to make the selection.

As used herein, the term "brain machine interface (BMI)" refers to a device or system (including at least one non-transitory memory and at least one processor) that enables communication between a user's nervous system (e.g., brain) and a controllable device to allow the user to mentally control at least an aspect of the controllable device. As an example, the BMI can acquire neural signals (e.g., via one or more electrodes), analyze the neural signals (e.g., to detect/decode/predict a neural activity pattern indicative of a thought about an intended posture, gesture, or the like), identify a portion of the neural signals as a neural activity pattern, and translate the neural activity pattern identified in the neural signals into commands that are relayed to the controllable device (e.g., based on a posture/gesture profile for the user stored in memory). One example of a BMI is a Brain Computer Interface (BCI).

As used herein, the term "mental control" refers to one or more neural activity patterns indicative of a thought of the user intending to perform a posture, gesture, movement, or the like, to voluntarily cause an action to be performed. The term mental control generally means a computerized/controllable action being performed in response to the detection of mental/neural activity related to intended actions.

As used herein, the terms "thinking of attempting", "intending", "imagining", and the like, can be used interchangeably herein to refer to a user's thought(s) of making the user's body act in a certain way to perform an action (e.g., assume/hold a certain posture or gesture), regardless of whether the body actually acts in the certain way in response to the thought. For example, a brain-machine interface can be employed to detect a user's one or more thoughts via neural signals.

As used herein, the term "posture" refers to a fixed, static position (that does not rely on velocity) of at least a portion of a user's body (e.g., the user's trunk, an arm, a hand, one or more digits, a wrist, a face, or the like) in space at a given time. For example, a hand posture can include specific held position of at least one of the hand, the wrist, or at least one finger (e.g., a held position of a thumbs up, a thumbs down, a fist, a flexed finger, an extended finger, or the like). In another example, a facial posture can include the held position of a lifted eyebrow or a raised corner of a mouth. A posture is distinct from a gesture, a posture is static and a gesture relies on velocity (e.g., a gesture can include the act of swiping a finger to the left, right, up, or down, while a posture can include only a position at the beginning or end of the swipe).

As used herein, the term "gesture" refers to one or more movements of at least one portion of a user's body at a given time or over a given period of time. Multiple postures at different given times may be sequentially combined together to represent, convey, or the like, a gesture, without necessarily iterating the full path of movement, for example swiping left to right can be represented by pointing left and then pointing right. As used herein, the term "gesture" can include one or more gestures and/or one or more postures (unless specifically stated).

As used herein, the term "controllable device" can refer to any device (or portion of a device) that can receive a command signal and then complete at least one action based on the command signal. Examples of controllable devices include, but are not limited to, a computer, a tablet, a mobile device, an environmental control element, a speech activation system, a robotic device, a prosthetic (e.g., for an arm, leg, hand, etc.), a soft robotic wearable (e.g., a glove), or the like.

As used herein, the terms "user" and "subject" can be used interchangeably to refer to any person, or animal, that can transmit neural signals to the BMI device. The person can be, for example, an individual with at least partial limb paralysis, an individual missing at least part of a limb or extremity, an able-bodied individual, or the like.

As used herein, the term "electrodes" refers to one or more conductors used to record and/or transmit an electrical signal (e.g., transmitting neural signals from a user's brain to a BMI). For example, electrodes can be on or against the skull (e.g., electroencephalography (EEG) electrodes or the like), near the brain (e.g., electrocorticography (ECoG) electrodes, any electrodes recording neural signals from blood vessels on or in the brain, or the like), and/or implanted in the brain (e.g., intracortical electrodes, deep brain electrodes, or the like). In some instances, two or more electrodes can be part of an array.

As used herein, the term "neural signals" refers to electrical signals generated by and recorded from a user's nervous system (e.g., at least a portion of the brain, like the cerebral cortex) by one or more electrodes and transmitted to a BMI. A plurality of electrodes can record an array of neural signals. At least a portion of the neural signals can include one or more mental/neural activity related to intended actions (but does not need to).

As used herein, the term "neural activity pattern" refers to at least a portion of one or more neural signals comprising recognizable neural features, such as threshold crossings and local field potential (e.g., spike band power), indicative of a specific thought of a subject, which can include an intended posture/gesture.

As used herein, the term "real time" refers to a time period, within 100 milliseconds, 50 milliseconds, 20 milliseconds, 10 milliseconds, or the like, that seems virtually immediate to a user. For example, an input (neural signals from the user) can be processed within several milliseconds so that the output (control signal after processing the neural signals) is available virtually immediately.

II. Summary

Individuals lacking partial or complete volitional control of the hands and/or fingers (e.g. disabled individuals, such as those with spinal cord injury (SCI), bulbar stroke, Amyotrophic Lateral Sclerosis (ALS), amputation, or the like) are often locked out of normal communication and interaction with the other people and/or devices. Brain-machine interfaces (BMI), such as brain-computer interfaces, have shown the ability to improve assistive communication and interaction options for these individuals lacking partial or complete volitional control of the hands and/or fingers as well as able-bodied individuals. A BMI can leverage a neural activity signal within a brain signal (e.g., reflective of the activity of single neurons or populations of neurons) to enable mental control of computers and other electrical devices (e.g., touch sensitive devices, such as tablets, mobile devices, etc., complex robotic machines, prosthetic limbs, smart appliances, or the like).

While BMIs can allow a user to mentally control inputs to electronically controlled devices generally, BMIs still struggle with allowing users to accurately, quickly, and intuitively select an element from one or more groups of elements (e.g., a key from a keyboard, where each row of the keyboard may be a group of keys). Generally, current BMIs rely on selection mechanisms that are not intuitive, require more complex decoding that can have variable accuracy, and/or take a significant amount of time to make selections. Described herein are systems and methods that can achieve high accuracy selections using the BMI. The systems and methods can allow for the selection of one or more groups of elements and/or one or more elements within a group of elements. The systems and methods make selection-based tasks more intuitive for a user.

III. Systems

Many current electronically controllable devices (referred to as "controllable devices") use posture and/or gesture (referred to as "gesture") controlled technology to facilitate inputs corresponding to selections that are based on a subject physically making a particular gesture. For instance, touch screens on smartphones, computers, tablets, smart appliances, and the like are programmed to react to taps, swipes, and the like. In another instance, more traditional computers react to the pressing of keys and/or the movement of a mouse and the click of mouse keys. In a further instance, video- and/or position-based inputs or sound-based inputs can be used to control certain devices and/or systems (e.g., computerized assistants responding to voice commands to control associated devices, clap on clap off lights, robotic systems responding to physical human movements, or the like). However, in certain circumstances, users (e.g., medically compromised and/or able bodied) may be unable to perform such physical gestures (including but not limited to movement of a portion of a limb, mouth (e.g., tongue and/or lips), eyes, facial muscles, and the like) and, thus, are unable to create inputs to the controllable devices. In these circumstances, a Brain Machine Interface (BMI), which has been developed to detect intended gestures, can enable a user to mentally control one or more of these controllable devices without requiring physical gestures.

BMIs are an evolving field. Current iterations of BMIs are successful at certain more basic tasks and functions (e.g., point and click functions), but these BMIs still struggle with intuitive and accurate selection of elements and groups, particularly when multiple selections are made consecutively. For instance, forming alpha numeric groupings such as words and/or numbers can require the user navigate between each letter and/or number as well as punctuations, etc. by mentally moving a cursor around a visually displayed keyboard, which can be time consuming and inaccurate. Selecting elements and groups is not limited to writing words and numbers on a computer, for instance, many of the common functions computers are used for everyday utilize element and group selection-opening window menus in any operating system, navigating video, gaming, and specialized work applications, and the like; playing keyed instruments such as the piano, and even changing the temperature and/or time on a thermostat, oven, or microwave.

Described herein is a system 10 (FIG. 1) that includes a BMI that can enable a user to mentally control selection-based tasks associated with a controllable device 26 more accurately and intuitively, and quicker than current BMIs. The selection-based tasks can be visually represented as one or more groups of elements, each group consisting of one or more elements. The groups and elements can be visualized in the system 10 in any known manner (e.g., tables, linear menus, radial menus, clusters, arrays, expanding menus, or the like) and the BMI can be configured to recognize one or more known intended gestures (e.g., thoughts of performing a gesture, whether or not actively performed, saved in memory during a system calibration). Each of the plurality of known intended gestures can be associated with making a group selection, making an element selection, and the like.

As shown in FIG. 1, the system 10 can include at least one neural recording device(s) 12 in communication (wired and/or wireless) with a neural decoding system 14 of a BMI. The neural decoding system 14 can also be in communication (wired and/or wireless) with a controller 20 that can in turn be in communication with a controllable device 26 and a display 28. FIG. 1 is only a representation of the system 10 and it should be understood that the components of system 10 described herein can be embodied as one or more devices. For instance, the neural decoding system 14 and the controller 20 are shown and described herein as separate components but could be embodied as a single component (e.g., sharing memories and processors). In another instance, the neural decoding system 14, the controller 20, the controllable device 26, and the display 28 can all be embodied as a single system such as a computer, tablet, or the like in communication with the neural recording device(s) 12. While not shown for ease of illustration and description it should be understood that the system 10 can include any other common components for functioning such as a battery and/or power source, circuitry, wireless transmitter(s), traditional control and notification interfaces (e.g., keyboard, mouse, touch screen, mechanical buttons or the like) for use by the user (if able), a technician, caregiver, and/or medical professional, and/or the like.

The neural recording device(s) 12 can record at least one neural signal of a user and can send the recorded at least one neural signal to the neural decoding system 14. The neural recording device(s) 12 can include at least one electrode (implanted and/or external) that can record at least one neural signal from the user's nervous system (e.g., a brain of the user). It should be understood that a brain of a subject is described herein, but BMIs (including the neural decoding system 14 and controller 20) can be operational with any one or more parts of a subject's nervous system. The electrode(s) can be positioned on and/or implanted into the brain of the subject. The electrode(s) may be on the skull (e.g., electro-encephalography (EEG) electrodes or the like), near the brain (e.g., electrocorticography (ECoG) electrodes, any electrodes recording neural signals from blood vessels on or in the brain, or the like), and/or implanted in the brain (e.g., intracortical electrodes, deep brain electrodes, or the like). The electrode(s) can, for example, be positioned on and/or implanted into at least one precentral gyrus of the brain of the subject (e.g., right and/or left) to detect and record neural signals at least related to intended/imagined gestures (e.g., of the hand, wrist, at least one digit of a hand, or the like). Without wishing to be bound by theory it is believed that the precentral gyri (left and right) feature heavily in providing motor control related signals to the rest of the body. Please note that intended gestures are not confined to the hand and can include a simple movement, a combination of movements, a posture, or the like. For example, the intended gesture can be related to a thought of a motion of at least a portion of a finger, at least a portion of a hand, at least a portion of an arm, at least a portion of a head, at least a portion of a leg, at least a portion of a foot, or the like.

In one example, the neural recording device(s) 12 can be at least one multi-channel intracortical microelectrode array positioned on and/or implanted into the brain. For example, two 96-channel intracortical microelectrode arrays can be chronically implanted into the precentral gyrus of the subject's brain. In another example, the electrodes may also be implanted and/or surface electrodes able to record from a portion of the subject's peripheral nervous system (e.g., for an amputee). The neural recording device(s) 12 can be connected to the neural decoding system 14 by a wired connection, a wireless connection, or an at least partially wired and wireless connection. The neural recording device(s) 12 can record and send neural signals to the neural decoding system 14 at real- and/or near real-time rates to facilitate the intuitiveness of mentally controlling the controllable device 26, for example every 1 millisecond or less, every 5 milliseconds or less, every 10 milliseconds or less, every 20 milliseconds or less, every 50 milliseconds or less, every 100 milliseconds or less, or the like.

The neural decoding system 14 can receive the neural signal(s) from the neural recording device(s) 12, filter and analyze the neural signal(s) into a neural activity pattern and determine if a command should be output based on the neural activity pattern. The neural decoding system 14 can include a memory 16 (e.g., a non-transitory memory) that can store instructions and a processor 18 that can execute the stored instructions. The instructions can include instructions for analyzing, filtering, and/or decoding the neural signal(s) as well as at least one saved user profile mapping neural activity patterns associated with the known intended gestures to commands for controllable device(s) 12. Commands can be sent to a controller 20, which can include a memory

22 (e.g., a non-transitory memory) and a processor 24, and can be in communication with (and can send a control signal to) at least a controllable device 26 and/or a display 28. In some instances, the neural decoding system 14 and the controller 20 can be separate devices that can each include a unique memory 16, 22 and processor 18, 24. However, in other instances, the neural decoding system 14 and the controller 20 can be a combined device and use separate instances of a common memory and processor.

In some instances, the memories 16 and 22 (e.g., non-transitory memories) (of the neural decoding system 14 and/or the controller 20) and the processors (of the neural decoding system 14 and/or the controller 20) can be hardware devices. Software aspects that can be implemented by the associated devices can be stored as computer program instructions in the non-transitory memories. The non-transitory memories can each be any non-transitory medium that can contain or store the computer program instructions, including, but not limited to, a portable computer diskette; a random-access memory; a read-only memory; an erasable programmable read-only memory (or Flash memory); and a portable compact disc read-only memory). The computer program instructions may be executed by the processors. The one or more processors can each be one or more processors of a general-purpose computer, special purpose computer, and/or other programmable data processing apparatus. Upon execution of the computer program instructions, various functions/acts can be implemented.

The controllable device 26 and/or display 28 can perform an action based on the indication. As illustrated, the controllable device 26 and the display 28 can be separate devices. It should be noted, however, that the controller 20, controllable device 26, and/or the display 28 can be part of a single device or may work together in concert (although they are illustrated separately). The controllable device 26 can receive the control signal from the controller 20 and then perform at least one action based on the control signal. The display 28 can, for instance, show a visualization of the one or more selectable groups and the one or more selectable elements within the groups to user. Examples of a controller 20, controllable device 26, and display 28 together include, but are not limited to, a computer, a tablet, a mobile device, or the like. Examples of a controllable device 26 that can be separate from display 28 and/or controller 20 can include an environmental control element (such as a motorized wheelchair, a smart piece of furniture, a smart thermostat (which can also include display 28), smart lightbulb, security/safety devices (e.g., cameras, alarms, or the like), or the like), a speech activation system, a robotic device, a prosthetic (e.g., for an arm, leg, hand, etc.), a soft robotic wearable (e.g., a glove), or the like. In some instances, the controllable device 26 and/or the display 28 can optionally send a feedback signal to the controller 20, such as information about the action being performed. The communication between the controller 20 and the controllable device 26, display 28, and the neural recording device(s) can be wired and/or wireless (e.g., WIFI, Bluetooth, etc.) in any combination thereof.

The display 28, which can be embodied separate from and/or combined with the controller 20 and/or the controllable device 26 can visualize a depiction of the one or more groups of one or more elements to the user. The depiction can depend on the controllable device 26 and the action the user desires the controllable device to perform. For instance, the display 28 can show a depiction that can be a virtual keyboard and the controllable device 26 can be a computer, tablet, smart phone, or the like running a word processing application, a communication application (e.g., text or email), or the like. The keyboard can be visualized, for example, as a table with rows and columns. Within the keyboard, the groups of elements can be in rows or columns of the keyboard. The one or more elements can be one or more keys (squares) in the one or more rows or columns. The controllable device 26 can output the one or more selected keyboard key (e.g., letter, number, punctuation, space, symbol, computer function, or the like) in a selected word processing application, communication application, or the like (which can also be shown on display 28 or another display associated with the controllable device).

In another instance, the display 28 can show a depiction of a virtual instrument such as keys or representatives of notes associated with a piano and/or another keyed instrument that can be virtually represented (e.g., woodwind, brass, percussion, strings, etc.). The one or more groups of one or more elements can be keys representing one or more octaves playable with the virtual instrument, groupings for notes that are flat, sharp, or natural notes, or the like. The one or more elements can be one or more keys associated with one or more notes or one or more visual representations of one or more notes of the virtual instrument in a selected octave, accidental, or the like wherein the response of the controllable device 26 can include playing an audible musical note. In a further non-limiting example, the display 28 can show a menu of options (e.g., a drop down, an expanding menu, a table menu, or the like). The one or more groups of elements can be one or more groups of one or more options. The one or more elements can be the one or more options. In some examples, one or more sub elements may be selectable from the one or more elements, wherein the one or more sub elements are one or more secondary options (e.g., like a start menu or a word processing application menu.

The neural decoding system 14 is described in further detail in FIG. 2. As noted, the neural deciding system 14 can include a memory 14 (such as a non-transitory memory) and a processor 16. The memory 14 can store instructions that are executed by the processor 16. The instructions can include at least: receiving 30 at least one neural signal of a user from at least one neural recording device; identifying 32 that the at least one neural signal of the user is representative of the user at least thinking of attempting to perform a gesture (in other words, determining that a known neural activity pattern exists); and outputting 34 a command of the plurality of commands based on the gesture. The gesture can be one of a plurality of known gestures. Each of the plurality of known gestures can be mapped to one of the commands of the plurality of commands. The mapping can connect known neural activation patterns representative of the user at least thinking of attempting the gestures with a control signal that can be predetermined by the user for a specific controllable device 26.

Identifying 32 can include several computational steps including extracting neural features from the neural signal(s) to form a neural activity pattern and then decoding the neural activity pattern to determine if a current neural activity pattern is sufficiently close to a known neural activity pattern of a known intended gesture. Extracting can include but is not limited to filtering and/or analyzing the neural signals. For instance, from each neural signal the extracted neural features can include at least one of, but are not limited to, threshold crossings, spike band power from between the 250 Hz-5,000 Hz band (e.g., using an $8^{th}$ order HR Butterworth filter), and local field potential power across five bands (0 Hz-11 Hz, 12 Hz-19 Hz, 20 Hz-38 Hz, 39 Hz to 128 Hz, and 129 Hz-150 Hz) (e.g., using short-time Fourier transforms).

A neural activity pattern for a time can be formed based on the combination of extracted neural features for each of the neural signals recorded. The extracted neural features (e.g., the neural activity pattern) can then be input into a decoder that can include a discrete classifier that can decode which gesture was intended based on neural activity patterns formed from the neural signal(s). For instance, the classifier can be a linear discriminant analysis (LDA) in conjunction with a Hidden Markov Model (HMM)(LAD-HMM) trained to differentiation between the plurality of known gestures and a default relax state (if the neural activity pattern is not determined to be close enough to any known patterns). As noted, the neural decoding system 14 can be in communication (wired and/or wireless) with the neural recording device(s) 12 and the controller 20. The command (e.g., control signal) determined based on the gesture can be output to the controller 20.

Figure 3:
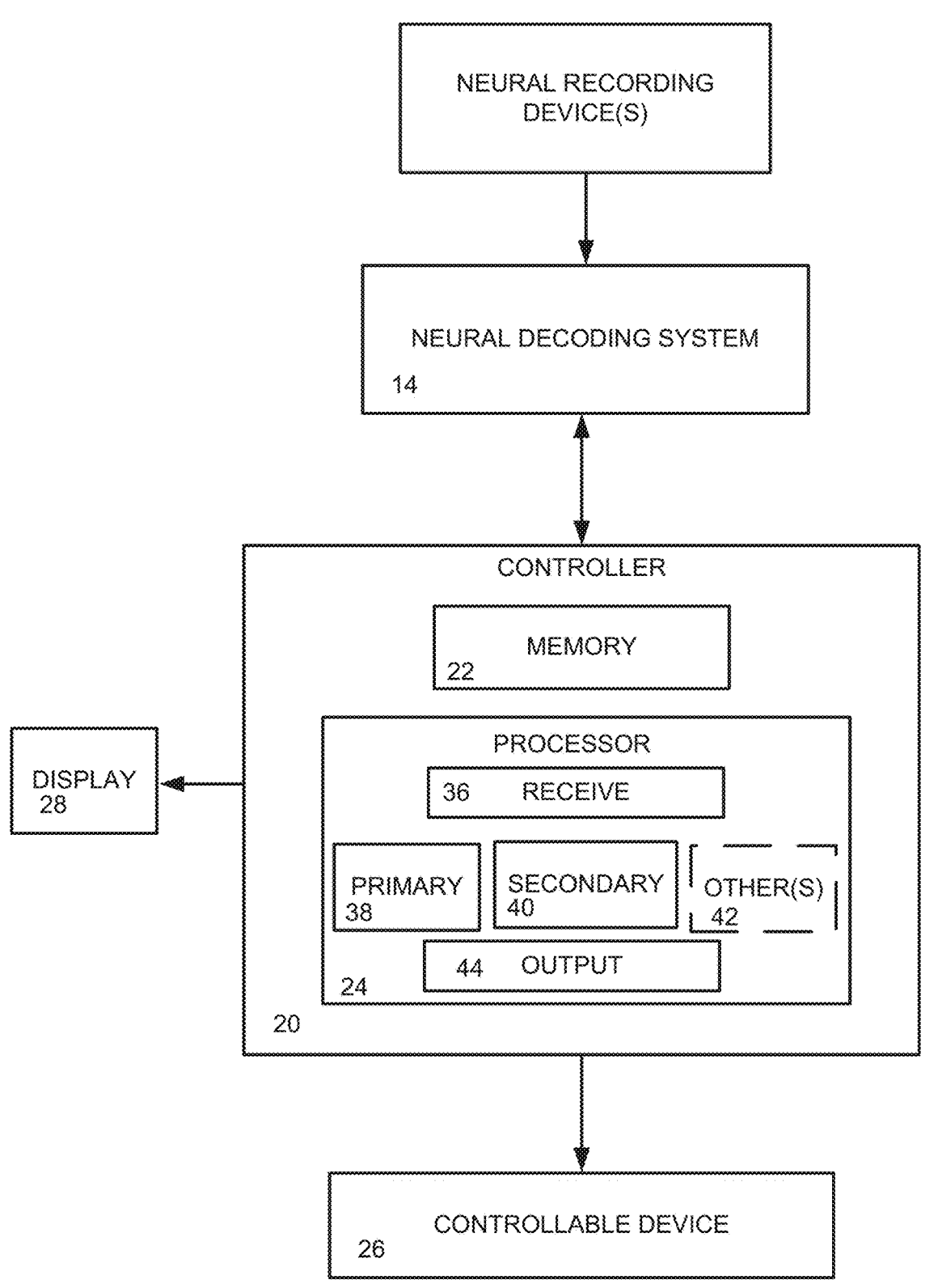

The controller 20 is described in more detail in FIG. 3. As noted, the controller 20 can include a memory 22 (such as a non-transitory memory) and a processor 24 (which may be the same or different from the memory 16 and processor 18 described above). The memory 22 can store instructions that are executed by the processor 24. The instructions include at least: receiving 36 the command associated with the gesture from the neural decoding system 14 and outputting 44 a response indicative of the active group of elements being activated and/or the element of the active group of elements being selected (e.g., visual response such as momentarily highlighting, enlarging, changing color, and/or the like) and/or sending a control signal to the controllable device 26 to perform an action (e.g., visual, physical, audible, or the like). If the gesture is a primary gesture 38, then the command associated with the primary gesture can select a group of the one or more groups of elements to be an active group of elements. For example, primary gestures can include (intended) flicks of the wrist up, down, left, right, or the like to change between rows and/or columns, for example. If the gesture is a secondary gesture 40, then the command associated with the secondary gesture can select an element of the active group of elements. The secondary gesture(s) can be different from the primary gesture(s). For instance, secondary gestures can include (intended) presses, flexes, and/or extensions of individual digits on a hand, where each digit (up to a common 10 digits, five for each hand) can be mapped to a specific element per group. In some instances, only one group and only one element per group can be active at a given time and each command can be indicative of a single selection (e.g., select one letter, selection ends b/c control signal ended, then select another letter). Optionally, other gesture(s) 42 can have other commands mapped to controlling aspects of the controllable device 26 and/or display 28 and a default relax command if no known gesture was determined. For instance, one of the other gesture(s) can include an instruction to visualize, activate, and/or deactivate the depiction of the one or more groups of one or more elements on the display 28.

Figure 4:
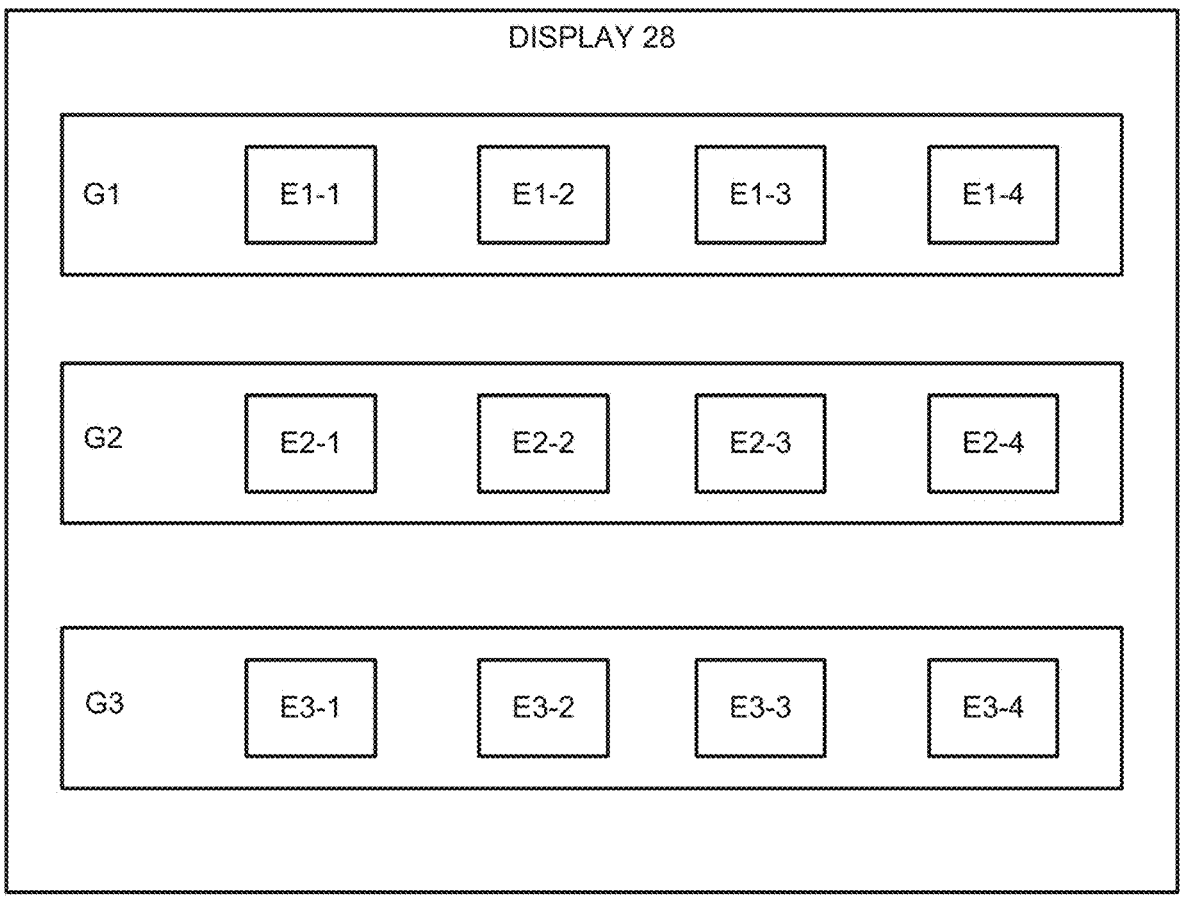
FIGS. 4-6 are illustrations of the display of the system of FIG. 1 in various stages.
Figure 5:
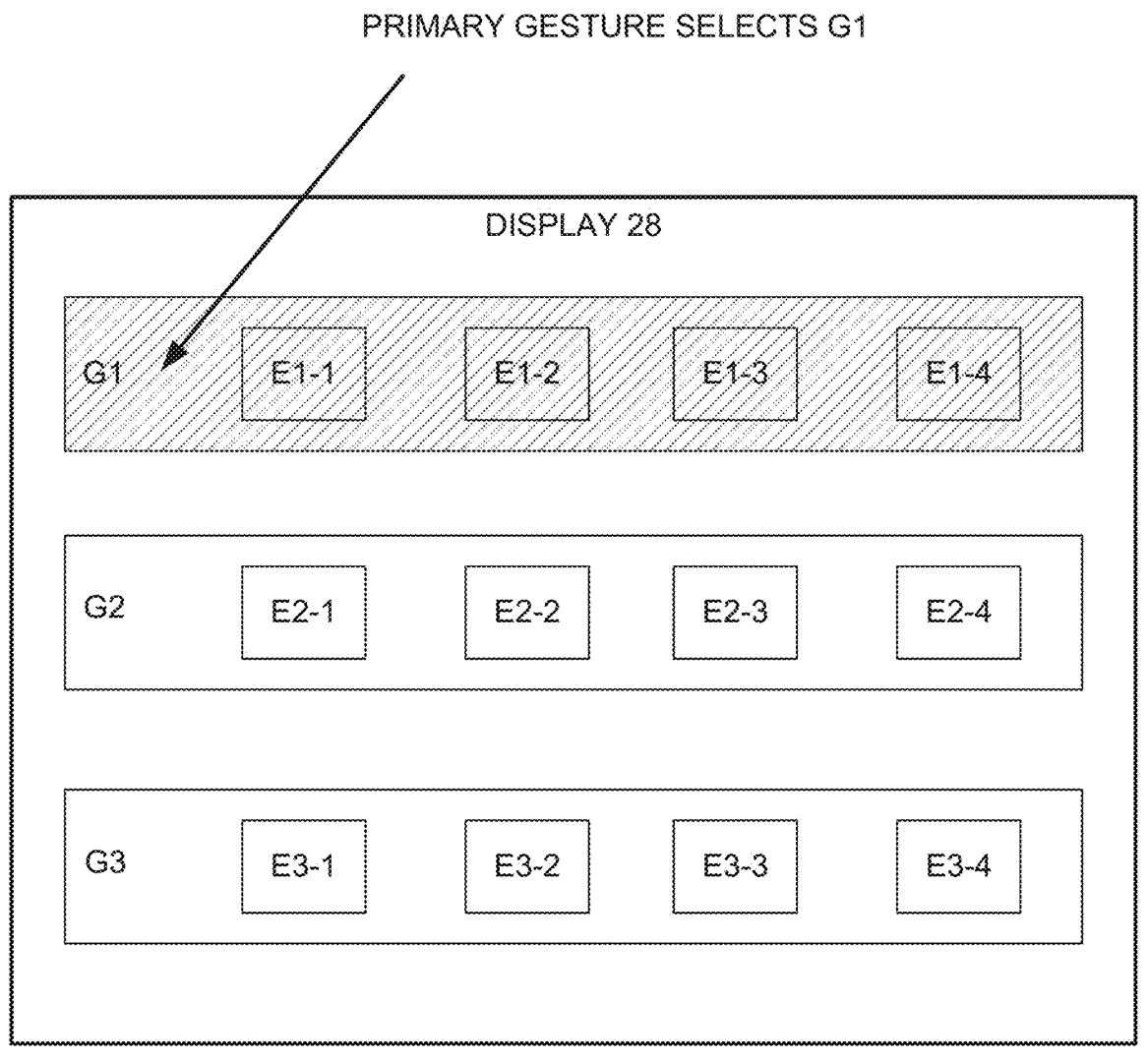
Figure 6:
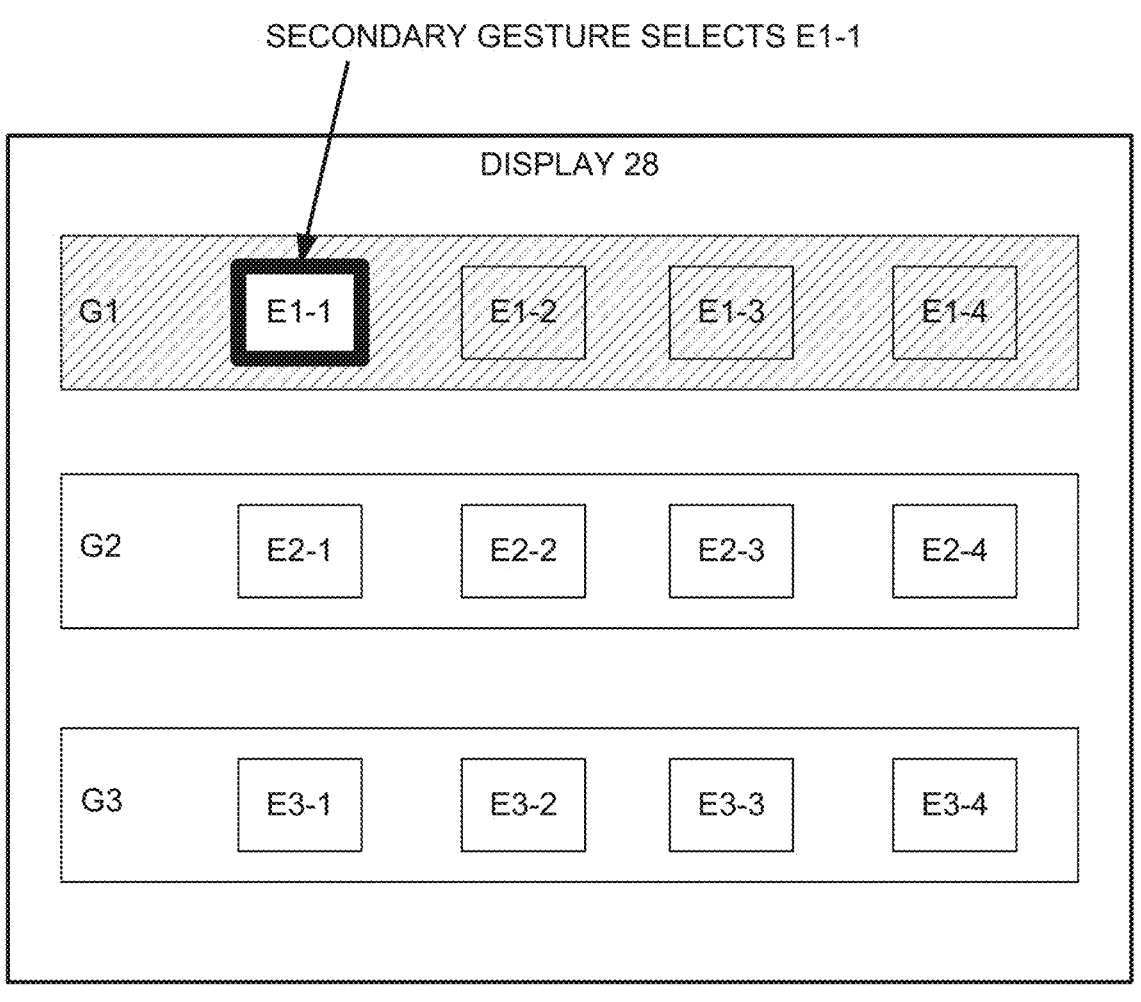

An example display with associated functionality by the system 10 is shown in FIGS. 4-6. In each case, the display 28 can visualize the depiction of the one or more groups of elements. The display 28 shown in FIGS. 4-6 displays three groups (G1, G2, and G3) as rows. Each group includes four elements in column positions. It should be understood that this is simply an example for illustrative purposes and any number of groups and elements one or greater and in any configuration is considered (e.g., table, linear, radial, freeform, combinations thereof, or the like). Each Group (G1, G2, and G3) is shown with the same number of elements per group, but each group can have a same and/or a different number of elements. As an example, the depiction on display 28 can be a keyboard with a layout that can be the same as, similar to, adapted from, and/or entirely different from a QWERTY keyboard. The groups can be a number of element(s) (e.g., rows on a keyboard) and the elements can represent, for example, letter(s), number(s), punctuation mark(s), a space, symbol(s), computer function(s), or the like. Other non-limiting examples can include depictions of menu options (where groups are main options and elements are sub options), keys or musical note(s) (where groups are octaves or accidentals, or the like. As another example each group of elements can include ten elements or less where selection of each element can be linked to a gesture of one digit of a hand (e.g., of the two hands) of a user). It should be understood that 10 is assumed to be intuitive for a user who currently or previously had control of their finger motor functions and "normal anatomy" but can be more or less depending on the user and/or different gestures linked to commands.

As shown in FIG. 5, single group (G1 as shown) may be selected as and made into the active group (highlighted with diagonal stripes). When a group is active than only elements within that group can be selected, but the user can choose to change the active group at any time. In some instances, the active group can remain active after an element is selected until a new gesture commanding changing the active row, selecting another element (which can be the same or different from the previous selection), and/or deactivating the depiction is received by the controller (e.g., controller 20). In other instances, the depiction can reset to no active group after each element selection. The selection of G1 on display 28 can be made in response to a primary gesture being thought about by the user. For example, the user can think of attempting to perform a gesture (e.g., flipping a wrist up or down until a G1 is selected). The thought of attempting to perform the gesture can be sent to the neural decoding system (e.g., neural decoding system 14) as neural signals recorded by the neural recording device(s) (e.g., neural recording device(s) 12). The neural decoding system can extract neural features from each of the neural signals and form a current neural activity pattern of the extracted neural features. The neural decoding system can then perform at least a discrete classification comparison between the current neural activity pattern and neural activity patterns stored in memory for known gestures. If the neural decoding system determines the current neural activity pattern is similar enough (e.g., a prediction that the neural activity pattern falls in a known pattern class), then the neural decoding system can output a command mapped to that known gesture/pattern to the controller. The controller (e.g., controller 20) can make the selection of row on the depiction visualized on display 28 based on the gesture.

When G1 is the active group, only E1-1, E1-2, E1-3, and E1-4 can be further selected (elements of G2 and G3 can be disabled unless a primary gesture changes the active group). In FIG. 6, when the user thinks about a secondary gesture, a single element (E1-1) is selected (as emphasized with the thick black outline). In some instances, multiple elements can be selected, but the selection can be confined to a single element at a time. Although not shown in FIG. 6, a response can be output by the controllable device (e.g., controllable device 26) that is indicative of the element of the active group of elements being selected.

For example, the user can think of attempting to perform a secondary gesture such as press down a portion of a digit of a hand (e.g., a pinky on a left hand) to select element E1-1. The thought of attempting to perform the gesture can be sent to the neural decoding system (e.g., neural decoding system 14) as neural signals recorded by the neural recording device(s) (e.g., neural recording device(s) 12). The neural decoding system can extract neural features from each of the neural signals and form a current neural activity pattern of the extracted neural features. The neural decoding system can then perform at least a discrete classification comparison between the current neural activity pattern and neural activity patterns stored in memory for known gestures. If the neural decoding system determines the current neural activity pattern is similar enough (e.g., a prediction that the neural activity pattern falls in a known pattern class), then the neural decoding system can output a command mapped to that known gesture/pattern to the controller. The controller (e.g., controller 20) can make the selection of element on the depiction visualized on display 28 obvious based on the gesture and can also cause the response from the element on the controllable device (e.g., controllable device 26) as discussed previously (e.g., write a word, letter, number, space, or symbol, cause a computer function, make a sound, or the like).

IV. Methos

Another aspect of the present disclosure can include methods 70, 80 (FIGS. 7-8) for achieving high accuracy selections of grouped elements using a brain machine interface (BMI). The methods can be executed by the system 10 of FIG. 1 (further described in FIGS. 2-6). The methods 70 and 80 are illustrated as process flow diagrams with flowchart illustrations that can be implemented by one or more components of the system 10. It should be understood that while neural signals from a brain of a subject is described herein, but the BMI devices can be operational with neural signals from any one or more parts of a subject's nervous system.

For purposes of simplicity, the methods 70 and 80 are shown and described as being executed serially; however, it is to be understood and appreciated that the present disclosure is not limited by the illustrated order as some steps could occur in different orders and/or concurrently with other steps shown and described herein. Moreover, not all illustrated aspects may be required to implement the methods 70 and 80.

Figure 7:
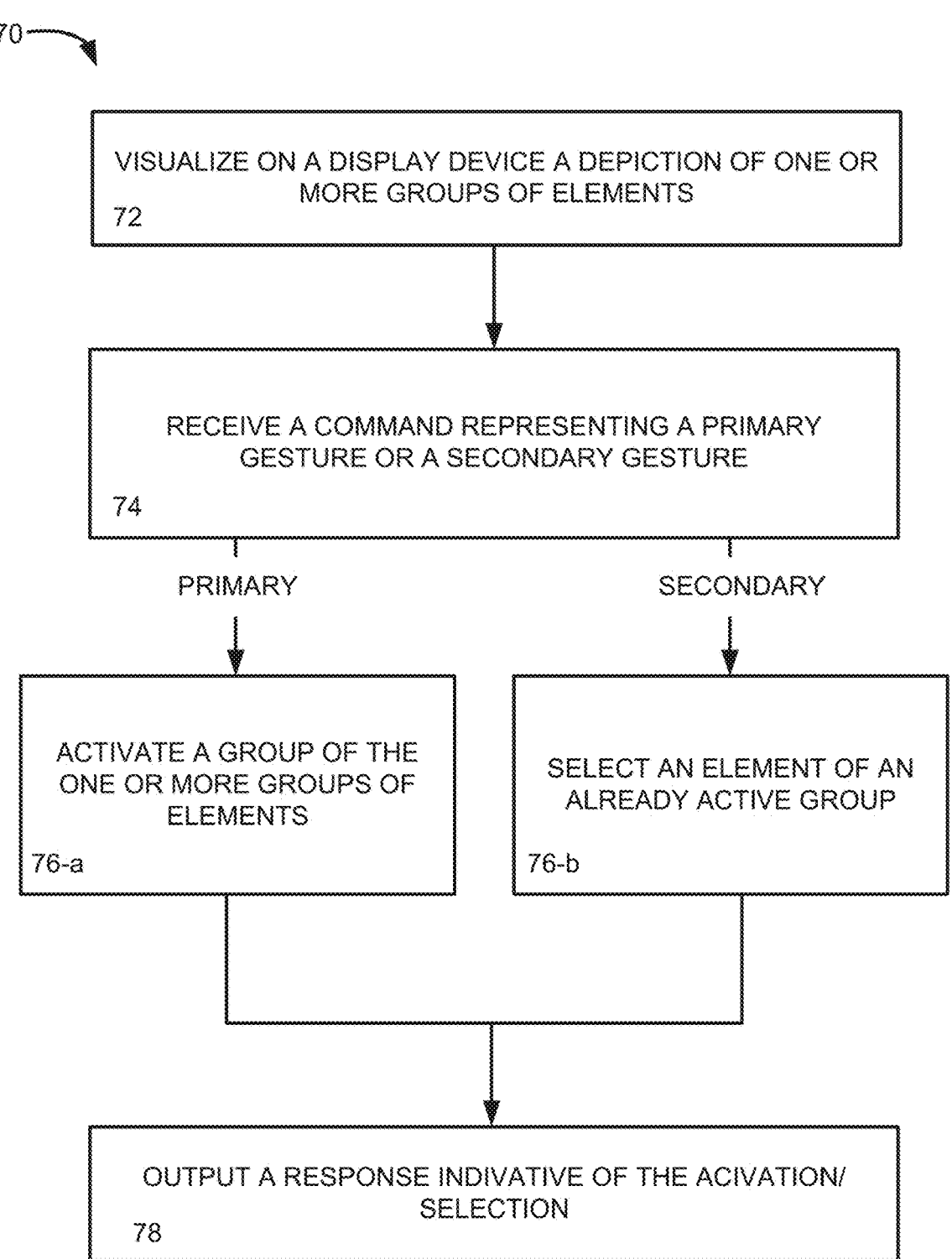
FIGS. 7-8 are process flow diagrams of methods for achieving high accuracy selections of grouped elements using the BMI.

FIG. 7 illustrates a method 70 for high accuracy selections of grouped elements performed by a controller (e.g., controller 20 including memory 22 and processor 24) in a BMI system (e.g., system 10). Such a method can be used to consecutively select a plurality of elements (e.g., writing words or sentences, playing an instrument, or the like). At 72, a depiction of one or more groups of elements can be visualized on a display device. Each of the one or more groups can include one or more elements and each group can have a same and/or a different number of elements. Each of the one or more groups can be an orderly grouping of the one or more elements, such as rows, columns, drop down menu, expansion menu, radial arrangement, linear arrangement, free-form groupings, or the like. For instance, the depiction can be a virtual keyboard in tabular format, a representation of an instrument (e.g., piano keys), a menu, or the like. Each of the one or more elements can represent a letter, a number, a punctuation mark, a space, a symbol, a word, a computer function, a musical note, or the like. In one instance, the visualization of the depiction on the screen can be controlled by a command sent to the controller (e.g., from the neural decoding system 14) that was triggered by the user intending (e.g., thinking) a gesture predetermined to start and/or activate the depiction on the display. In some instances, another gesture-based command can trigger the deactivation of the visualization of the depiction.

At 74, a command can be received from a neural decoding system that can represent the user at least thinking of attempting to perform a gesture. The gesture can be a primary gesture or a secondary gesture (and in some instances another gesture as discussed above for opening, activating, or deactivating the depiction or the like). For example, certain gestures (thoughts of attempting to perform the gestures) can be pre-categorized as primary gestures and others as secondary gestures to enable smooth, accurate, and timely selections of one or more elements, but particularly a plurality of elements consecutively. The primary gestures and the secondary gestures can be different gestures. In one non-limiting example, primary gestures can be wrist gestures (e.g., flipping or bending up, down, left, right, or the like), In another non-limiting example secondary gestures can be gestures such as pressing, flexing, extending, or bending of one or more digits of one or more hands (e.g., pinky, ring finger, middle finger, index finger, and/or thumb or right or left hand). At 76-a, if the gesture is a primary gesture, a group of the one or more groups of elements can be activated. When one group is activated, the one or more elements within that group can be selectable. Elements within a not activated group can be un-selectable. Each group can be switched between with a primary gesture. At 76-b, if the gesture is a secondary gesture, an element of the active group of elements can be selected. In some instances, one element can be activated at a time and in other instance, one or more elements can be simultaneously activated. As an example, the number of elements in a group can include ten elements or less, and each of the ten elements or less can be linked to a gesture of one of ten digits of a hand of the user (e.g., each digit can be linked to an element).

At 78, a response indicative of the active group of elements being activated and/or the element of the active group of elements can be output. Activating a group of the one or more groups of elements can include activating the elements of the activated group for selection, and/or causing a visual change indicating the activation on the depiction (e.g., highlighting, coloring, or otherwise showing the activated group is different from the un-activated groups). In some instances, activating a group can include causing an action on a controllable device (e.g., if the controllable device is a computer including the controller and the display selecting a first level of a menu can cause a new sub-menu to appear). Activating an element can cause the depiction visualized on display to change to make the selected element obvious for a time (e.g., highlighted, colored, outlined, etc.). The response from the element can be the visual display and/or can be an action performed on and/or by the controllable device (e.g., controllable device 26) as discussed previously (e.g., write a word, letter, number, space, or symbol, cause a computer function, make a sound, or the like).

Figure 8:
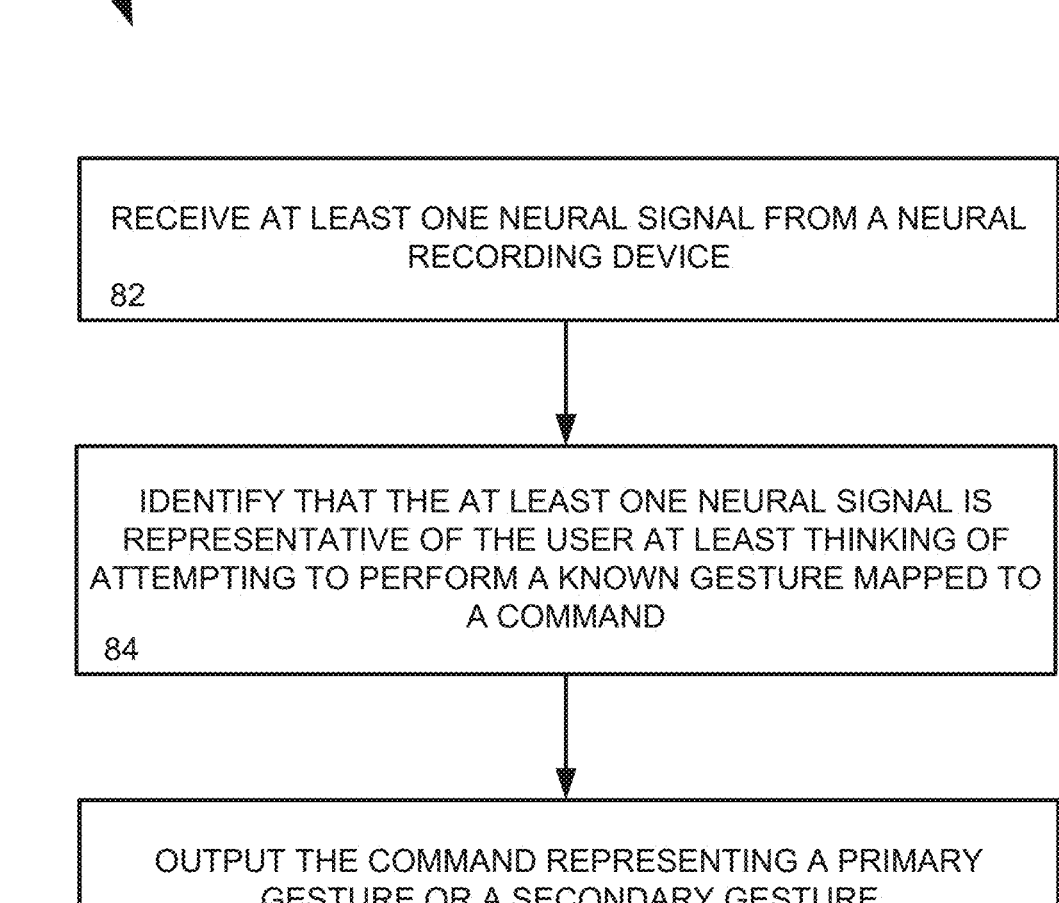

FIG. 8 illustrates a method 80 performed by the neural decoding system of a BMI to enable highly accurate selection of grouped elements. Such a method can be used to consecutively select a plurality of elements (e.g., writing words or sentences, playing an instrument, or the like). At 82, at least one neural signal can be received from at least one neural recording device by wired and/or wireless communication. The at least one neural recording device can include one or more electrodes to record and send the at least one neural signal, such as a micro-electrode array implanted in a precentral gyrus of a user's brain. The neural signals can be indicative of a user at least thinking of attempting to perform a gesture (whether or not the gesture is actually performed is irrelevant). The neural decoding system can include neural activity patterns for a plurality of known gestures, each linked to a predetermined command. The gesture can be a simple movement, a combination of movements, a posture, or the like. For example, the gesture can be related to motion of at least a portion of a finger, at least a portion of a hand, at least a portion of an arm, at least a portion of a head, at least a portion of a leg, at least a portion of a foot or the like. At 84, a gesture can be identified based on the at least one neural signal that is representative of the user at least thinking of attempting to perform a known gesture mapped to a command. The gesture can be one of the plurality of known gestures mapped to a plurality of commands. Additionally, if the no known gesture is determined it can be automatically linked to a waiting/do nothing command. Identifying the gesture can include several computational steps including extracting neural features from the neural signal(s) to form a neural activity pattern and then decoding the neural activity pattern to determine if a current neural activity pattern is sufficiently close to a known neural activity pattern of a known intended gesture. Extracting can include but is not limited to filtering and/or analyzing the neural signals. For instance, from each neural signal the extracted neural features can include at least one of, but are not limited to, threshold crossings, spike band power from between the 250 Hz-5,000 Hz band (e.g., using an $8^{th}$ order HR Butterworth filter), and local field potential power across five bands (0 Hz-11 Hz, 12 Hz-19 Hz, 20 Hz-38 Hz, 39 Hz to 128 Hz, and 129 Hz-150 Hz) (e.g., using short-time Fourier transforms). A neural activity pattern for a time can be formed based on the combination of extracted neural features for each of the neural signals recorded. The extracted neural features (e.g., the neural activity pattern) can then be input into a decoder that can include a discrete classifier that can decode which gesture was intended based on neural activity patterns formed from the neural signal(s). For instance, the classifier can be a linear discriminant analysis (LDA) in conjunction with a Hidden Markov Model (HMM)(LAD-HMM) trained to differentiation between the plurality of known gestures and a default relax state (if the neural activity pattern is not determined to be close enough to any known patterns). At 86, the command, based on the gesture, can be output to the controller and then to the controllable device for a response. As an example, if the gesture is the primary gesture, then a row or column can be selected to be an active row or column. If the gesture is the secondary gesture, one of the keys in the active row or column can be selected. A response to selecting an element in a selected group can be displaying a letter, a number, a punctuation mark, a functional key, a space, or the like.

V. Experimental

The following experiment describes using an intracortical brain computer interface (iBCI) (a specific type of brain machine interface (BMI)) with an assistive typing program for direct selection of keys on a virtual keyboard. This program improves over traditional hunt-and-peck letter selection methods by enabling direct selection of keys on a virtual keyboard (4 rows, 10 keys each row) without cursor navigation.

Methods

Participants

The participant in this study, T11, was enrolled according to the inclusion criteria of the BrainGate2 Pilot Clinical Trial (www.ClinicalTrials.gov; Identifier: NCT00912041; Caution: Investigational Device. Limited by Federal Law to Investigational Use). The responsible Institutional Review Boards granted permission for this study (including Mass General Brigham and VA Providence Healthcare System). At the time of this study, T11 was a 39-year-old man with tetraplegia due to a C4 AIS-B cervical spinal cord injury. T11 had two 96-channel intracortical planar microelectrode arrays (Blackrock Neurotech, Salt Lake City, UT) placed into the dominant (left) hand-knob area of precentral gyrus (PCG) 11 years after the initial injury. The first research session in this study was performed 1307 days post-implant (also referred to as Trial Day 1307).

General Experimental Setup

All research sessions were completed at participant T11's place of residence using the BrainGate neural interface system. During each session, participant T11 was seated in front of his personal computer monitor that displayed the output of a PC running keyboard tasks in the Unity Game Engine. A Clinical Neurotechnology Research Assistant (CNRA) was present at all sessions to interact with the participant, connect the neural signal recording devices, manage the iBCI equipment, and instruct the participant regarding the tasks to be performed during the session. A typical session consisted of multiple "blocks", in which the participant completed one of the tasks that are described in detail in the sections below. The session always started with a 3-minute "reference" block during which the participant remained in a neutral state in order to determine the baseline statistics and spike thresholds of the recorded neural signals to be applied in the subsequent blocks. Following this reference block, the participant completed one 10-minute block of an Open Loop keyboard task during which he attempted a series of key (digit) selections and/or wrist actions in response to onscreen cues without receiving any feedback. Data from the Open Loop block was used to build the first digit or digit+wrist movement decoders. After this, multiple Closed-Loop typing blocks followed where the neural signals were used to decode intended gestures and results were presented to the participant on the screen. For Closed-Loop blocks the participant was able to view the output of the neural decoders in real time, reflecting decoded finger and wrist movements and receiving feedback on whether a decode was correct, or incorrect. These Closed-Loop blocks provided typing metrics and additional calibration data for new neural decoders built between blocks. Each research session typically lasted around three to four hours including preparation and breakdown. This study comprised 11 daily sessions spanning 10 months. Sessions initially evaluated 10-digit decoding on a one-row subset of the virtual keyboard, and then progressed to multi-row keyboard with automated row switching with pseudo-randomly selected characters. Finally, a sentence copy task with a multi-row keyboard and row switching enabled by wrist gesture decoding would follow.

Neural Signal Acquisition

With participant T11, neural data was recorded from the two implanted 96-channel microelectrode arrays and transmitted using a Brown Wireless Device (BWD) connected to each of two percutaneous pedestals. The BWDs sampled neural data at 20 kS/s and transmitted this data over 3.2 GHZ and 3.5 GHz carrier frequencies, respectively, to nearby planar antennas that relayed the signals to wireless receivers (Blackrock Neurotech) and on through Digital Hubs to two clock-synchronized 128-channel Blackrock Neural Signal Processors (NSPs) after resampling neural signals to 30 kS/s. The Blackrock system distributed neural signals in UDP Ethernet packets for processing and decoding in a custom neural signal processing system. A dedicated computer running the xPC real-time operating system with Simulink Real-Time (MathWorks, Natick, MA) received the streaming neural data from the NSPs and performed all signal processing, feature extraction, and decoding.

Neural Signal Processing and Feature Extraction

In each session, neural features were computed from each of the 192 channels (total across both microelectrode arrays) through a custom neural signal processing pipeline. Signal processing included decimating the neural data to 15 kHz followed by within-array common average referencing (CAR) that subtracted an average signal computed from the 40 channels with the lowest root-mean-square value of the channels on each array. CAR channels were selected based on an initial three-minute reference block in which the participant was asked to relax and face the screen without any attempted movement. Activity was down sampled and processed in real time to yield two features of neuronal activity—threshold-crossing spike rates (ncTX) and spike power—from each channel. The "ncTX" threshold-crossing spike rates were obtained via a non-causal bandpass filter with corners at 250 Hz and 5 kHz applied onto the pre-processed neural data and binned in 20 millisecond time bins. A causal $4^{th}$ order Butterworth filter with the same frequency band was applied onto the pre-processed data to extract the power within the filtered spike band in 20 millisecond time bins. Each 96-channel array produced these two features per channel, for a total of 192 features per array, 384 total available neural features. By passing these features through the decoder described below, decoded neural commands were sent every 20 milliseconds to the PC displaying the keyboard tasks.

Decoder Design and Calibration

Figure 9:
FIGS. 9-19 are diagrams showing results of an experiment that demonstrate high accuracy selection capability using an intracortical brain computer interface (iBCI).

Attempted finger and wrist movements were decoded from the ncTX and Spike Power neural features using a discrete classifier pipeline consisting of multiclass Linear Discriminant Analysis (LDA) followed by a Hidden Markov Model (HMM) (FIG. 9). This decoder pipeline was originally developed and used for the decoding of all ten digits in a novel piano task. This model could decode 11 and 13 classes, (C=11 or C=13), corresponding to the attempted movement of all 10 digits, a possible two additional states for left- or right-hand wrist flexion and extension, and a single "No Action" class, representing a rest state. The online decoder process starts by taking in z-scored neural features and first performs feature smoothing using a 100-millisecond causal boxcar filter; after which an LDA projection matrix that's obtained during calibration projects the filtered data into a lower dimension subspace (C-1, 10 dimensions or 12 dimensions). An LDA component that performed dimensionality reduction which maximizes the variance between classes while reducing the variance within classes was applied. Class posterior probabilities for each gesture class are calculated via the forward algorithm of the HMM using the projected features and all probabilities are normalized such that the sum of probabilities is equal to 1. A gesture class was considered "decoded" in this pipeline and sent to the virtual keyboard any time its posterior probability exceeded a hard-coded threshold of 98% that was determined from sweeping through neural data offline. At any given time, the decoder can make predictions on any gesture that the participant attempts to do whether it's a wrist gesture or a digit gesture. However, during any time bin, the decoder is only able to output a single prediction, meaning that there won't be a case where the decoder can predict two fingers being pressed at once, or a finger press and wrist movement being performed at the same time.

Decoders were built using the following calibration process. For the 11-state decoder (10-digits, 1 no-action), an Open Loop block of Task 1 (Single Row Random Typing Task) was run in which the participant is asked to press and hold a key for the entire two second cue period until the key on screen changes color to green, indicating the end of the trial. This Open Loop block typically consisted of 200 trials, resulting in an even distribution of 20 trials per digit, around 10 minutes of initial training data. During sessions, this would be the only Open Loop block used for building decoders and so the following blocks would ideally be all Closed Loop. During Closed Loop iterations of Task 1, a new decoder would be built after each block containing all previously run blocks, ensuring an even distribution of classes. For the 13-state decoder (10 digits, 1 wrist flexion, 1 wrist extension, 1 no-action), an initial Open Loop block of the Multirow Random Typing Task with Manual Row Switching (Task 3) lasting around 10 minutes with 60 typing trials and roughly 60 row switch trials was sufficient to build an initial decoder. The following closed loop (CL) iterations of Task 3 would be used to build new decoders containing all previously run blocks combining open loop (OL) and CL data. Following these guidelines, there was never an instance where the data from an 11-class block would be fed into the training set of the 13-state decoder and vice versa. There was no mixing of gesture classes at any point throughout this study. Due to the character imbalance found in sentence text prompts, new decoders would not be built after each CL Copy Task block unless performance had degraded below a threshold of 75% in task accuracy.

During decoder calibration, neural features are selected for the decoder if their response varied significantly between all digit classes (Kruskal-Wallis test P<0.001). In previous studies, it's been found that optimal decoder builds rely on data coming from appropriate windows of activity and rest periods. The decoder takes the selected features and first finds the peak array-wide response of all normalized neural features and then selects attempt and null-epoch windows by sweeping through multiple windows to build the best decoder. This window optimization allows us to select the neural data around an attempt peak that will produce the best decoder parameters.

Each time a decoder is initialized, 5-fold cross validation is performed to train the decoder. The best window during decoder calibration is selected by picking the attempt window and null-epoch window that produces the highest Matthews' Correlation Coefficient (MCC), (as close to 1 as possible, indicating a perfect predictor), upon building a decoder with those windows. MCC is used instead of a percentage accuracy as the calculation of the MCC is useful when the classes are of different sizes, which can happen in this case if decoders are built using characters unbalanced sentences or blocks with several row switch trials. Null-epoch windows tend to be between −400 and −100 ms relative to the peak response, attempt windows tend to be −40 to 500 ms relative to the peak response.

The LDA projection coefficients are estimated from the selected neural features at the defined windows using a regularization term of 0.45 that was determined by sweeping through neural data offline. Selected neural features at the defined attempt/null windows from the training data are projected via LDA and then the projected data is used to calculate an emission mean and covariance for the HMM using the data's empirical mean and covariance. The transition matrix of the HMM is set using the proportion of transitions between the gesture and no action states in the blocks used to build a decoder.

Keyboard Design

Demonstrated herein is the use of a virtual keyboard that resembles a traditional keyboard layout, the QWERTY keyboard, with some modifications to account for iBCI-specific neural inputs and control strategies. The reason to stick as close as possible to the QWERTY layout is to reduce the learning-curve participants will encounter upon using this keyboard; ideally, this keyboard would be as intuitive to use now as before the onset of their paralysis.

Figure 10:
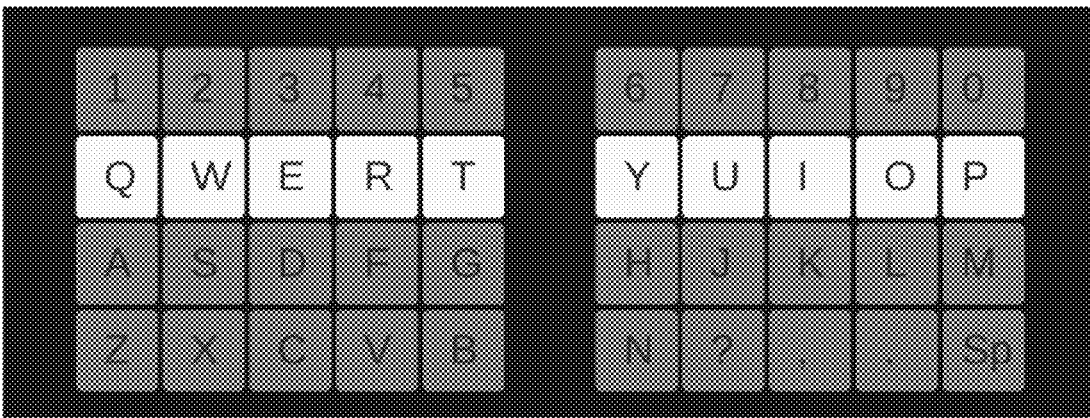

The keyboard consists of multiple rows of 10 keys, where each key in a row is mapped to a single finger (FIG. 10). For example, if the top row is active, each numerical digit is mapped to an individual finger, (1 corresponds to the left pinky, 5 for the left thumb, 6 for the right thumb, 0 for the right pinky). Throughout use, only one row of the keyboard is active at a time, but users can switch the active keyboard row using an attempted wrist gesture (e.g., a participant imagines a wrist flexion with their left or right hand to switch to the row above). Today, the keyboard only consists of 40 keys which include: all 26 letters in the English alphabet (all presented in uppercase), all 10 numerical digits, three punctuation marks (comma (,), period (.), and question mark (?)), and a Space key. For these studies, no function keys (ctrl, shift, etc.) and no Delete or Backspace keys were included as part of this initial design.

In traditional QWERTY keyboard layouts, the Space bar is much larger and placed towards the middle of the keyboard for easy physical access, whereas in this design, the space key is placed in the lower right-hand corner of the keyboard. Although a future design of this keyboard may not reflect this current state, this position of the Space key is due to previous research suggesting that the participant's contralateral pinky finger performed the best with an established 10-digit decoder. This design for a keyboard where only one row is active can be seen similar to current touch-typing methods for able-bodied typing which are commonly taught in elementary or middle school, where each finger is mapped to one or two columns of keys on the keyboard.

Typing Task Design

The tasks used in this study were designed to gauge how an intracortical BCI can be used for typing applications using imagined finger and wrist gestures. Over the course of the study, the participant was asked to use an onscreen keyboard presented using software developed on the Unity 3D Game Engine for the purposes of this study. Across all sessions, participant T11 was instructed to focus on attaining accurate typing, and not to focus on typing quickly. Participant T11 was asked to perform variations of the following five implemented tasks.

Task 1: Single Row Random Task

This first cued-response task asked the participant to attempt digit movements in response to single characters cued (highlighted) on a single row of the full on-screen keyboard using the 11-state LDA-HMM decoder for all ten digits.

Figure 11:
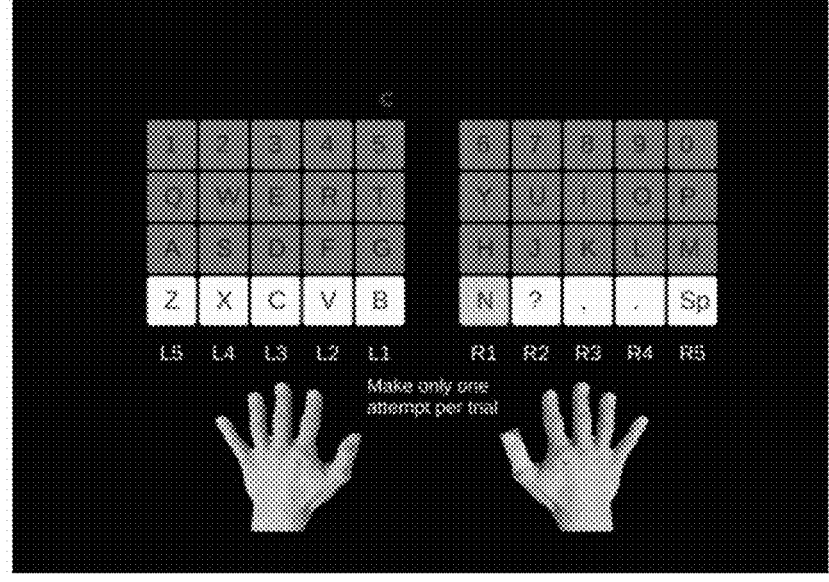

After a one second inter-trial interval during which any decodes emitted from the decoder were rejected by the task and no cues were presented on screen, a character was cued by highlighting the on-screen key yellow along with the corresponding finger on a cartoon hand (FIG. 11). This key was cued on screen for two seconds allowing for the participant to respond within that time window.

In the open loop version of this task, the participant was asked to attempt to press the cued finger and hold the attempt until the two seconds elapsed at which point both the key and finger shown on screen were colored green and the cued character appeared on a line above the keyboard, indicating the end of the trial. When this happened, the ITI started and the participant was to release their attempt.

In the closed loop version of the task, the participant was similarly asked to attempt to press the cued finger, but the trial ended as soon as a correct or incorrect decode was accepted by the task or when the two second trial period elapsed (followed by the ITI). The participant was asked to release their attempt when the trial ended because of any decode or timeout. Any given block of the Single Row Random Task highlighted only a single row of the keyboard within the full keyboard displayed on screen, and all 10 digits were sampled uniformly from that single row for the duration of that block. As an example, a single block of this task would prompt participants to type 100 characters from the same single row (e.g. the first row with numerical digits shown in white, with all other rows shown in grey), corresponding to an even distribution of 10 trials sampled for all ten fingers. When the trial ended, the currently decoded character appeared at the top of a screen in either white text indicating a correct trial, or in red text indicating an incorrect trial. In order to ensure that the participant was taking time to answer accurately instead of as soon as the cue was presented, there was a lockout period of 200 milliseconds during which the keyboard logic would reject any decodes received from the decoder. This lockout duration was selected to roughly approximate human reaction time during which no valid neural decodes were expected.

Task 2: Multirow Random Task with Automated Row Switching

This task is like the Single Row Random Task with the difference that instead of characters all being cued on a single row of the keyboard per block, the participant was asked to type characters cued across all rows of the keyboard. Over the course of this study, there existed two versions of this task. In this Automated Row Switching version, upon completion of a trial, the active keyboard row would randomly switch to a different keyboard row to cue a character that was not on the previously active keyboard row. This process of switching keyboard rows was automatic and not controlled by participants.

Task 3: Multirow Random Task with Gesture-Controlled Row Switching

Figure 12:
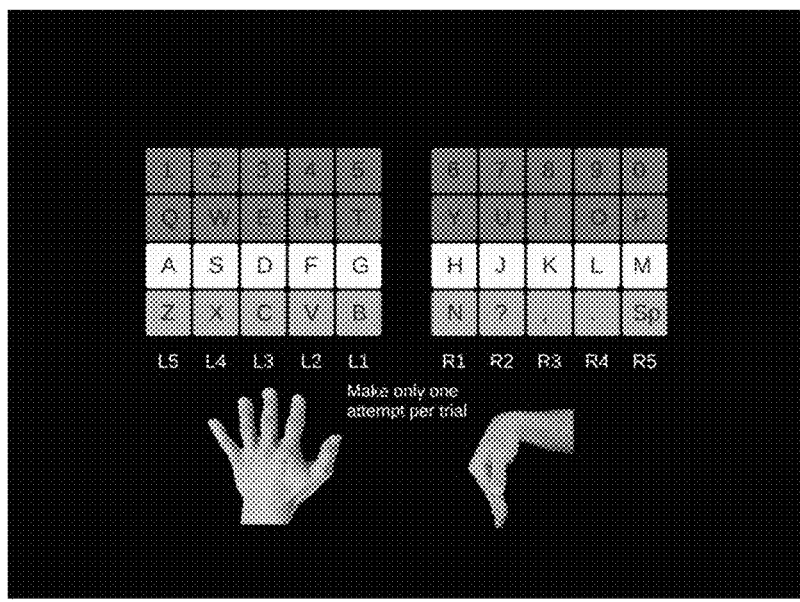

This different version of the task allowed for participant-controlled row switching, using an expanded 13-state LDA-HMM decoder. When a character on a different row was cued on screen by the game, the target keyboard row would be cued yellow to the participant and the corresponding row-switch imagery (wrist flexion/wrist extension) would be displayed by a cartoon hand below the keyboard (FIG. 12). Before the start of the first blocks involving participant-controlled row-switching, the participant was asked to choose which wrist (left or right) he would prefer to use for the row switching action. Switching rows would happen one row at a time, so that if a character was cued two rows away from the current keyboard row, the participant would have to perform two individual row switching movements to reach the cued row. Like character selection trials, each individual row switch was treated as a "trial" with a timeout period of two seconds followed by a 1-s ITI. The Open Loop trial waited the full two seconds before cueing the next row. The Closed Loop version cued the next row upon a correct decode or timeout. An incorrect wrist decode would result in a red X being shown on screen briefly before moving on to the next trial.

Because this was the first task to combine wrist and digit decoding for controlling the keyboard, wrist and digit decoding were segregated. Whenever a row switch action was cued, the keyboard would disregard any decode of a digit class and would only react to a decoded row switch command (wrist flexion or extension). Likewise, during character selection trials (that is, when the proper row was active), the keyboard would only accept decoded digit commands and refuse all wrist gesture commands. The reaction time lockout as described in Task 1 also applies to row switch trials. For 200 milliseconds after the row cue is presented, the keyboard logic would reject any incoming decodes from the decoder.

The number of row switch trials per block was programmatically constrained to enforce a 1:1 ratio of total row switch (wrist up or wrist down) trials to total character (digit) trials. In between character selection trials, the game logic would pseudo-randomly select a row and a key, and if the empirical ratio of row switch to typing trials (updated after every corresponding trial) was above 1, the next trial would stay locked to the same keyboard row and thus become a character-selection trial. As an example, the Open Loop block that typically ran near the start of a session consisted of 60 character selection trials, which provided 6 training examples per digit and 60 total training examples for the wrist gestures.

Task 4: Sentence Copy Task with Automated Row Switching

The goal of this task is for the participant to copy, letter by letter, a sentence prompt presented on the screen. Sentence prompts including jokes or puns were prepared before each session to promote participant engagement.

Like the three Random Tasks above, characters from the sentence prompt were cued one at a time. Because sentences were not limited to characters on one row of the keyboard, the structure of this task followed that of the Multirow Random Task. Like the Multirow Random Task, there were two versions of this task tested. This Task 4 version focused on evaluating ten finger control in the context of a task that presented characters on multiple keyboard rows; switching between rows of the keyboard was automated by the game logic. Thus, this version of the Sentence Copy Task used the 11-state decoder (10 digits and a no-action class).

Each Copy Task block asked the participant to copy a different text prompt shown on screen, and each prompt consisted of roughly 40-85 characters including spaces. An example of a prompt that was used is the phrase "THE QUICK BROWN FOX JUMPS OVER THE LAZY DOG." This phrase contains every letter in the English alphabet at least once (although the right pinky finger is overrepresented because each space between words is mapped to that finger).

Task 5: Sentence Copy Task with Gesture-Controlled Row Switching

This second version of the Sentence Copy Task, featured in later sessions with T11, was when the switching of rows of the keyboard was controlled by the participant. All the nuances regarding the row switch trials, and the interactions between row switch and typing trials as described in Task 3 also apply here.

Performance Metrics

Several metrics were used in order to evaluate the effectiveness of this mixed-gesture virtual keyboard as a communication method. As a first performance metric, all closed-loop tasks presented in this thesis report behavioral task performance in terms of trial accuracy calculated as the number of correct trials divided by the total number of trials. A trial is defined as either a character selection or a row switch action as either one could be cued and decoded independently. It can be informative to differentiate errors arising from incorrect digit decodes from errors arising from incorrect wrist decodes and so a total trial accuracy can be separated into an accuracy for total character selection (digit press) trials and an accuracy for total row switch (wrist flexion/extension) trials. This was particularly useful for calculating the performance of each individual gesture which is demonstrated in confusion matrices for each block and for the cumulative results of the study. In figures, the classes are denoted as follows: fingers are ordered starting from the left pinky as L5 to the left thumb as L1, and then the right thumb as R1 going to the right pinky finger as R5. Demonstration of performance of wrist gestures will be written according to the action they represent (Row Up, Row Down) due to this study only measuring the responses from the right wrist.

The metrics used to describe typing speed and rate include the following. Able-bodied typing rates are often reported in terms of characters typed per minute, which is calculated by counting the total number of characters typed divided by the total typing time in minutes. Here, a more informative metric that has been used in literature is the correct characters per minute (ccpm), which is similarly the number of correctly typed characters divided by the time duration of the block. An additional performance metric of the BCI communication strategy is the achieved bitrate. This is a measure of the net rate at which correct communication selections were transmitted in a period of time.

The bitrate B is defined in equation (1) with the following terms: N refers to the number of selections that can be made. In session blocks that used the 10-digit (11-state) decoder with a single-row of the keyboard active and no manual row switching, N=10 due to the participant only being able to select between the ten keys available on a single row of the keyboard. In blocks that used the 13-state decoder (digit+ wrist), N was equal to the number of total keys that could be selected in the keyboard given that the participant was able to switch to any row. For a 4-row keyboard with gesture row switching (Task 5), N=40. $S_c$ refers to the number of correct character selections in time t, $S_i$ is the number of incorrect character selections (not counting timeouts), and tis the total length of the block in minutes including timeouts, incorrect decodes, and inter-trial intervals.

$$B = \frac{\log_2(N-1)\max((S_c - S_i), 0)}{t} \quad (1)$$

For all variations of the typing tasks constrained by timing windows (Tasks 1-5), two different minimum typing rates can be observed. For tasks 1, 2, and 4, timing windows with a two second time-out period and a one second intertrial interval means that typing one character will require 3 seconds, which corresponds to a character selection rate of 20 characters per minute.

With the Manual Row Switch tasks however, a one-row switch would require at least 6 seconds (one row switch+one character selection), a two-row switch would require 9 seconds, and a 3-row switch would require 12 seconds. As a result, these tasks enforced typing rates between 5 characters per minute and 20 character selections per minute, dependent upon the degree of row switching in the block.

However, in the Closed Loop tasks (3 and 5), a digit or wrist decode could end trials before the two second timeout and the participant was able to achieve greater typing speeds, theoretically up to 60 characters per minute (limited by the 1-s post-decode ITI).

The participant's response time to each cue was also measured. This was computed as the amount of time to first decode after each go cue. If a trial timed out, the error was logged but no response time was included for that trial. The 200 ms decoder lockout period, combined with the 2 second trial time resulted in a range of response times between 220 ms and 2000 ms.

Neural Signals Analysis

Internal markers of behaviors related to typing such that future efforts can easily build decoding methods that do not rely on external cues were investigated. Blind source separation methods such as Independent Component Analysis (ICA) can be used to find representations of internal markers between different stages in a task. The type of signal that this technique can be used on are recordings of Local Field Potentials extracted from each microelectrode array. Briefly, for each channel, the data can be decimated down from 1000 Hz further to 250 Hz and then examine the power spectral density (PSD) of the signal at different frequencies using Welch's method. This analysis can be performed to make comparisons of frequencies below 35 Hz before the cue onset and some period of time centered around typical response times (e.g., half second windows taken after 200 milliseconds of reaction time) after the cue onset for each typing trial to determine which frequency bands are more likely to display movement-related information.

With an identified frequency band, the decimated 250 Hz data can be filtered down to the frequency band of interest using a 400 order bandpass FIR filter at specific corner frequencies and perform some preprocessing steps before training the ICA model to extract independent components. This preprocessing includes z-scoring the LFP data and smoothing with a 50 millisecond Gaussian filter to attenuate noise.

Neural Subspace Analysis

It was examined to find out if each of the gestures used in this study can be successfully mapped to individual clusters in a subspace such that decoders can have an easy time differentiating between classes. Linear Discriminant Analysis is used in the decoder pipeline to perform dimensionality reduction on the data down to either 10 or 12 dimensions, maximizing the variance between classes while minimizing the variance within each class. For a given decoder build, the LDA projected training data at the optimized windows can be examined by plotting the top two or three dimensions to see point clouds where each gesture clusters.

Results

Summary of Sessions

This study conducted a total of 11 research sessions with participant T11 between April 2023 to February 2024. All research sessions were performed at T11's personal residence.

A typical session with participant T11 consisted of multiple blocks in which the participant completed one of the keyboard tasks. Each session started with a 3-minute reference block and following this reference block and a single short OL block to introduce the participant to the task, at least one 10-minute block of Open Loop calibration data was collected from either the Single Row Random Task or the Multirow Random Task. With this OL data, the first multistate decoder can be initialized in preparation for Closed Loop blocks to reach a baseline state decoder performance of about 75%. A session featured a sequence of four or five Closed Loop Random Task blocks (Single Row or Multirow) that started with 60 typing trials per block and increased in increments of 20 until reaching 120-140 typing trials per block to achieve a minimum target performance of at least 85%, at least 20 total examples per class were commonly required. During the later Row Switch focused sessions, typing would require as few as two but no more than four blocks (at most 360 total trials) of Closed Loop data to get typing performance above the threshold established earlier. Row switching would only require a single block's worth of data to reach satisfactory performance. For tasks involving row switching actions, the number of total row switch trials was nearly equal to the number of typing trials, which was chosen by design in session planning to ensure a proportional balance between examples of a single finger press and either wrist gesture, roughly one in five. In six sessions (1, 2, 3, 6, 9, 11), after the Closed Loop Random task blocks were completed (either Tasks 1 or 3), the participant was able to complete Copy Task blocks (Tasks 4, 5) to assess performance of the Closed Loop decoders.

There are some notes to be made on the performance of the participant on specific days. Session 1 collected neural data during the first presentation of the open-loop keyboard task; decoders were assessed offline and this session did not include any closed-loop blocks. In the initial closed-loop sessions 2-5) low closed-loop decoding accuracy was observed and 10-digit decoding was consistently below the reference target performance of roughly 90% observed for finger decoding in a piano task. Further, the distribution of decoding errors in those initial sessions did not match the expected pattern of near-neighbor confusions predicted. This was due to the research beginning using decoder code that, in contrast to the previous study, was generalized and boilerplate for any discrete multiclass classification task used within the group. The breakthrough in decoding performance was established between sessions 5 and 6 (separated by 10 days), where the fully realized decoder was reached, allowing for more accurate decoding of attempted finger movements during the following session days.

Closed Loop Performance with 10 Gestures

Over the course of research sessions with participant T11, eight sessions were focused on attaining accurate 10 digit typing control. During these sessions, all of the typing that the participant was asked to do did not involve any row switch gestures; the action of switching between rows was handled automatically by the game logic. Thus, the multi-state decoders in these closed-loop blocks consisted of 11 classes (ten digit classes+one no action class). The tasks performed by T11 were the Open Loop and Closed Loop Single Row Typing task (Task 1), and the Closed Loop Copy Typing with Automated Row Switching task (Task 4). Because Task 4 automatically switched between keyboard rows and required only 10-digit actions by the participant, analysis of Task 4 is included here with the other 10-digit tasks.

Figure 13:
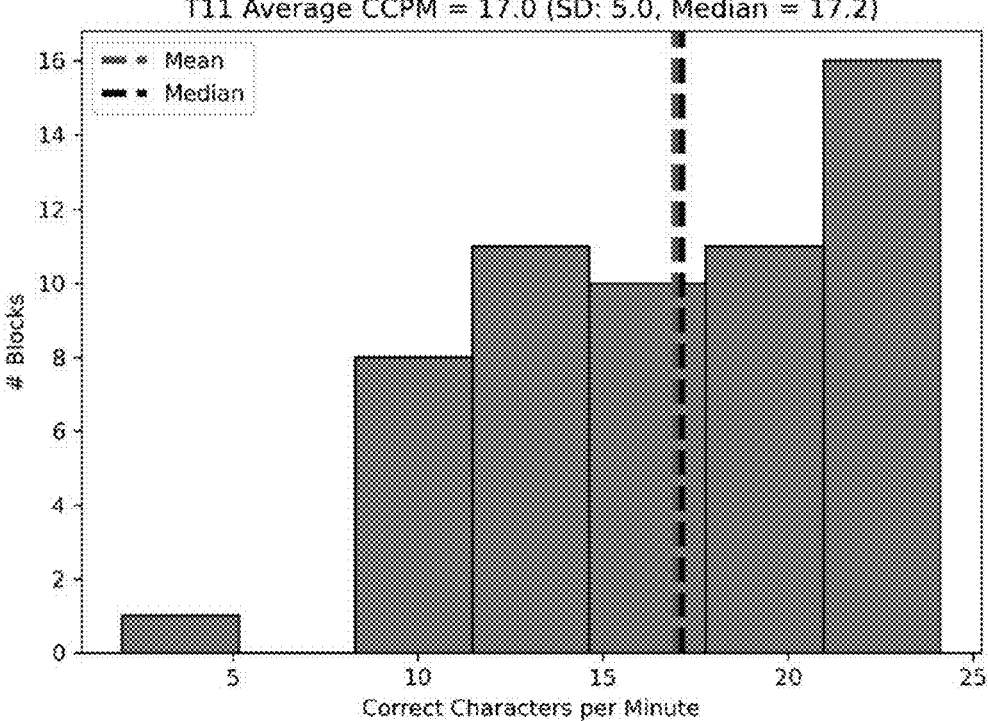

Over the eight sessions (#2-#9) that included the closed-loop 10-digit decoding tasks, participant T11 achieved an average typing accuracy of 74.8% (chance: 10%) and a mean typing rate of 17.0 (SD: 5.0) correct characters per minute across 3884 total typing trials. Of these, 201 (5.2%) were timeout trials in which no digit was decoded above the threshold probability of 98%. The best performance in a single Closed Loop block occurred in Session 6 with an accuracy of 93.4% and a correct typing rate of 23.1 CCPM when T11 was asked to type the following sentence (61 characters including spaces): "INSPECTING MIRRORS IS A JOB I COULD REALLY SEE MYSELF DOING.". T11's typing rate measured in correct characters per minute was higher than the median of 17.2 in these later sessions (#6-#9) with a top rate of 24.1 correct characters per minute (FIG. 13). T11's average bitrate during these sessions was 0.56 (SD: 0.41) bits per second.

Closed Loop 10 Gesture Performance with the Improved Decoder

To highlight the impact of the decoder improvements mentioned earlier, can consider just the 10-digit decoding sessions in which the finalized decoder implementation was used. Sessions 6-9 provide a better indication about the current state of accurate ten digit decoding. Ten-digit decoding accuracy averaged 81.0% over these four sessions with all digits scoring at least 70% and as high as 91.1% on a right hand digit (FIG. 11). The diagonal of the confusion matrix shows that right hand digit actions were more accurately decoded than left hand digits. The number of No Decode trials also reveals that digits of the left hand more often resulted in a no decode than digits of the right hand. The majority of decoding errors reflected confusion with adjacent digits. There was also a tendency, for all digits, for confusion between the same digit on left and right hand. This digit decoding performance served as the target baseline not just for the sessions in this study but for future research that asks participants to type using the 10-digit paradigm.

Figure 14:
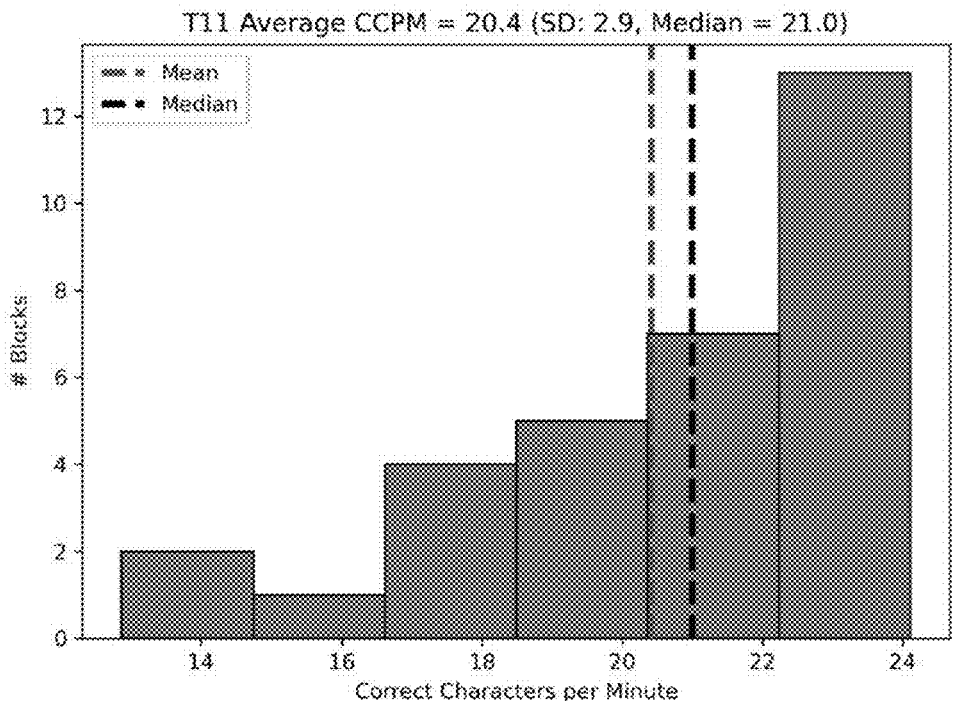

The higher accuracy of decoding was associated with an increase in average typing speed for this set of sessions. These four sessions revealed consistently faster typing than during the first Closed Loop sessions, with a mean typing rate of 20.4 ccpm and over half the blocks exceeding 21.0 ccpm (FIG. 14). The bitrate for these sessions is at its highest for this 10 class paradigm with an average of 0.88 (SD: 0.24) bits per second.

Closed Loop Performance with 12 Gestures Including Row-Switching

Participant T11 completed additional tasks in two later sessions (Sessions 10 and 11) designed to test his ability to have full control over the ten-finger keyboard, now including the ability to control the switching of the keyboard row in response to specific row switch cues. The tasks introduced in these sessions were the OL and CL Multirow Typing task with Manual Row Switching (Task 3), and CL Copy Task with Manual Row Switching (Task 5). The 13-class decoder was introduced in these sessions to enable wrist-up and wrist-down decoding for row switching (in addition to the 10 digit and 1 no-decode classes). Decoding performance was assessed several ways: for all trials (combined row-switch and key selection accuracy), for wrist actions (two wrist-up and wrist-down decoding classes), and for typing alone (10-digit accuracy).

Figure 15:
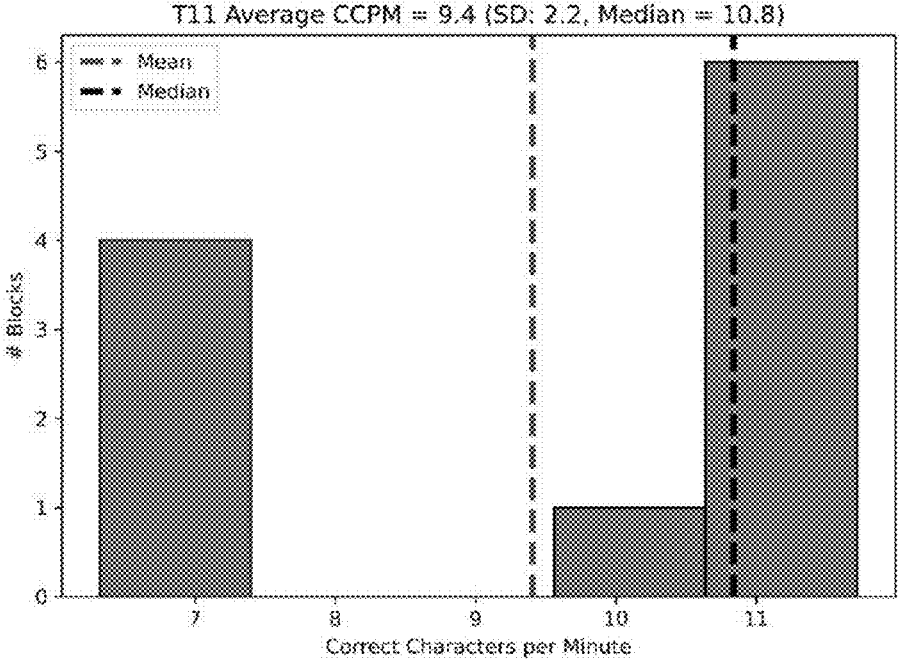
Figure 16:
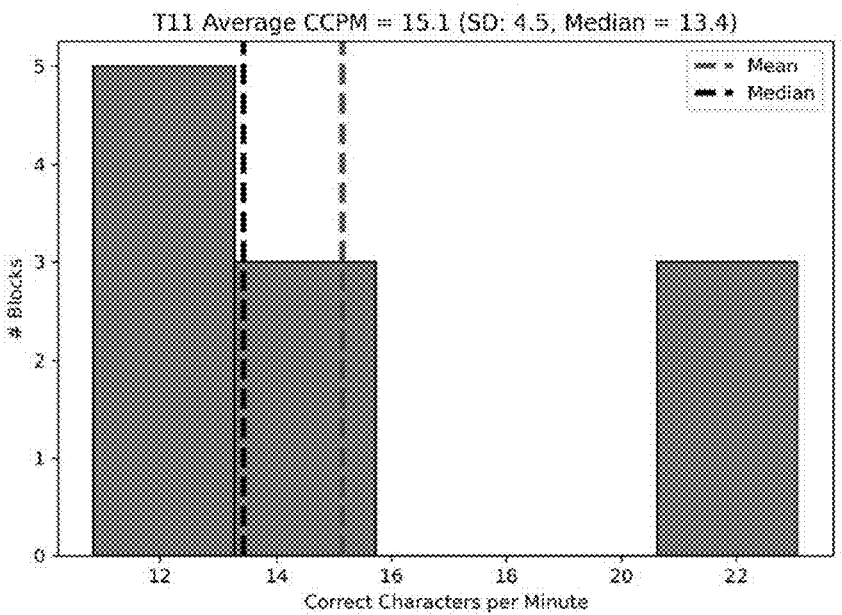

Over both sessions, with these new tasks and the 13-class decoder framework, T11 typed 568 characters correctly at a mean rate of 9.4 (SD: 2.2, Median=10.8) ccpm (FIG. 15). This reflected the time spent not just on character selection, but also the time spent across 807 row switch trials. By removing the time spent on row switch trials, an average correct typing rate of 15.1 (SD: 4.5, Median: 13.4) correct characters per minute can be approximated (FIG. 16).

Over 1532 total trials (725 character selection, +807 row switch), overall decoding accuracy was 87.9% (78.3% digit decoding, 96.4% row switch; chance: 7.7%). There were 82 trials (5.4%) that were recorded as timeout trials in which no digit nor wrist gesture was decoded above the threshold probability of 98%. There was very little confusion between the wrist-up and wrist-down gestures.

T11's first session controlling row switching (session #10) produced impressive performance. Overall, the session had an average total decoding accuracy of 86.0% (68.3% character selection, 95.5% row switch). Despite the lower character selection performance in comparison to previous 10-digit typing sessions, the final block of this session (Task 3, 100 characters requiring 128 row switches) was the best performing block in this study, with a per-trial decoding accuracy of 95.2%, dividing into 89% character selection accuracy (89 correct trials out of 100) and 100% accuracy on row switching trials (128 out of 128). Only four trials resulted in a no-decode.

On the second row-switching session with T11 (session #11), the primary goal was to assess his ability to control the keyboard and row switching when copy typing entire sentences (as opposed to typing individual characters cued one by one). The average typing rate for this session was 10.5 (SD: 1.6) ccpm. Decoding performance in this session was higher than the previous session with an average trial accuracy of 89.3% (82.2% character selection trials, 96.3% Row Switch trials). However, a greater number of no-decode trials was observed. A few important highlights from this session include a perfect decoding accuracy for the right thumb and record performance for the left index and pinky fingers. The average typing bitrate recorded across the two row-switching sessions was 0.66 (SD: 0.27) bits per second.

Typing Response Times

Figure 17:
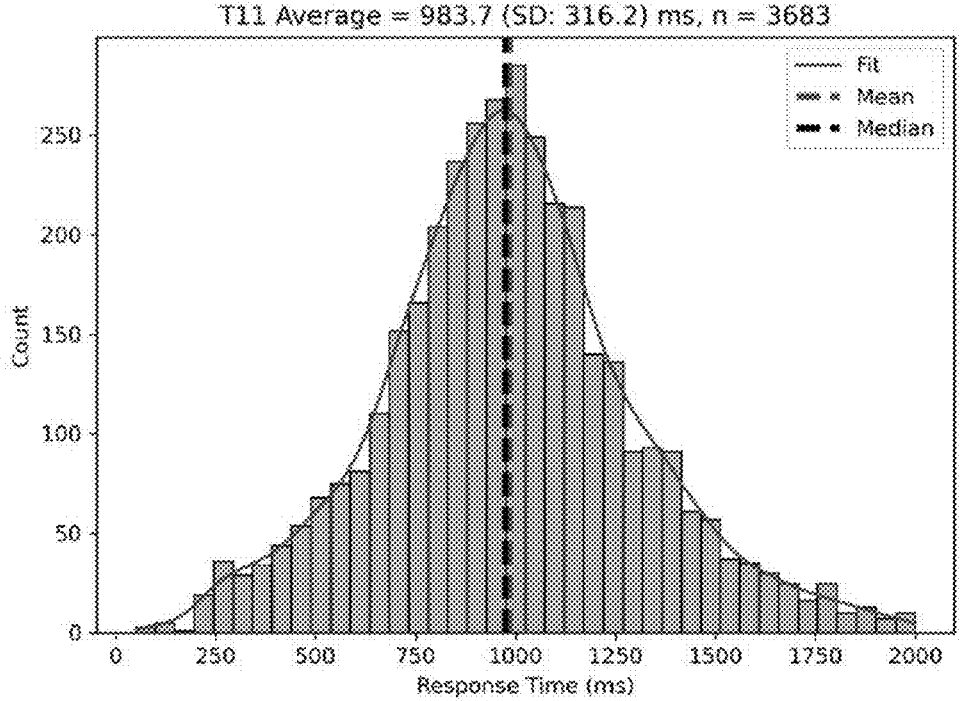
Figure 18:
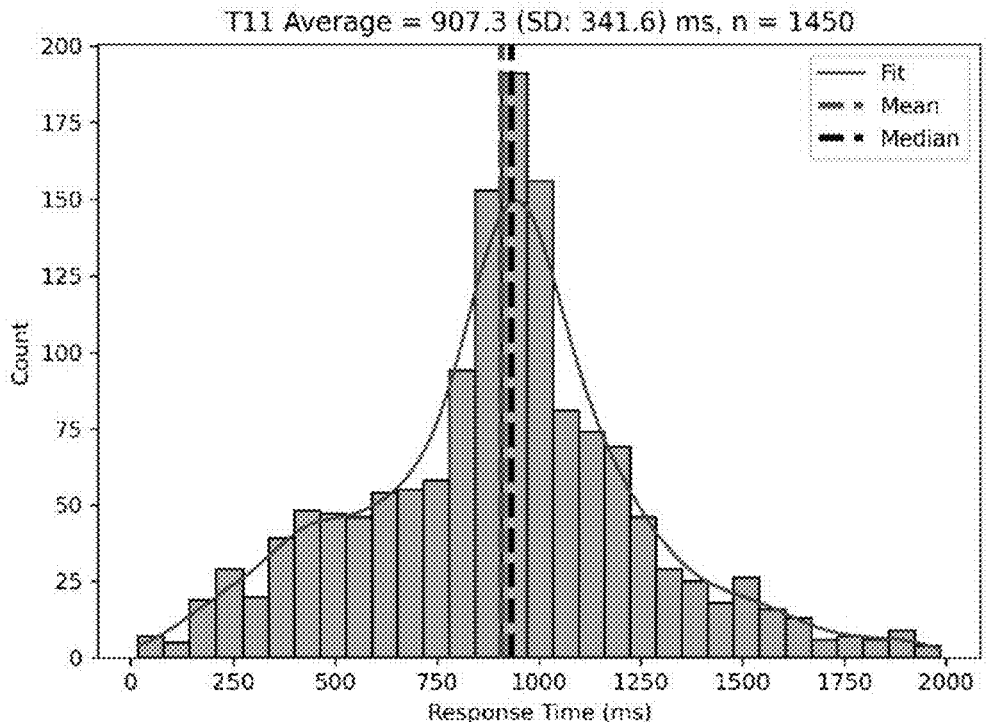
Figure 19:
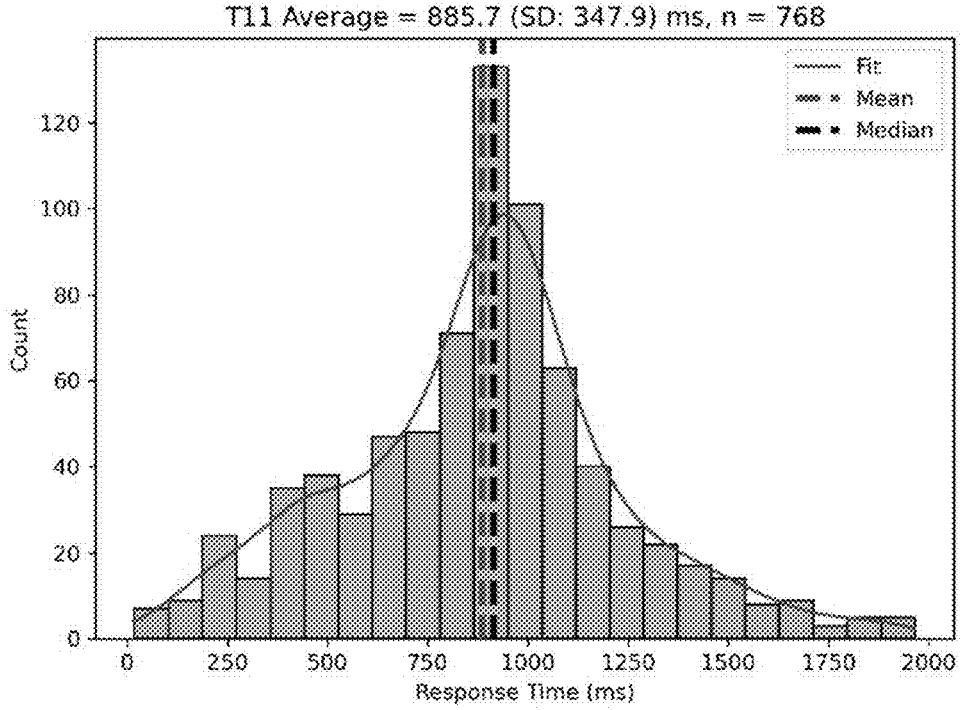

Across all Closed Loop blocks in sessions #2-#9 T11 had an average response time of 983.7 (SD: 316.2) milliseconds for the 10 digit typing paradigm, calculated from the responses to 3683 typing trials that were not recorded as timeouts (FIG. 17). In Sessions #10 and #11 that featured the row switch trials controlled by wrist flexions and extensions, T11 had an average cue response time of 907.3 (SD: 341.6) milliseconds in 1450 trials that were not recorded as timeouts (FIG. 18). The final two sessions had a slightly quicker average response time, most likely due to T11 responding quickly to row switch trials (FIG. 19)

Decoder Analyses

Combining the results from the two typing paradigms (10 digit and 10 digit+wrist), a cumulative mean decoding accuracy was found to be 83.6% (SD: 8.6%). Across both hands in all 10 closed loop sessions, an overall mean accuracy of 80.4% (SD: 6.7%) was found. On a single-hand decoding basis, a mean accuracy for the right hand of 86.3% (SD: 3.4%) was found, and the left hand had a mean accuracy of 74.3% (SD: 3.2%). With the addition of two wrist gestures, decoding performance remained above 80% overall.

An important question, given the constraint on row-switch responses during character selection trials and vice versa during the Manual Row Switch tasks, is how frequently the decoder predicted a row switch command during a character typing trial or vice versa. For sessions 10 and 11 where this question comes up, across a total of 207,352 bins that each collects 20 milliseconds worth of neural data and decoder outputs, there were a total of 42 total instances where either a digit decode was sent to the task during a row switch trial or vice versa. This is equal to around 0.02% of the total bins or, in the time domain, less than one second of the total length of all blocks in these two sessions which was 1.15 hours. By applying an offline quantification of the wirelessly-recorded neural data, 20 of those bins (400 millisecond) were identified that were marked by the system as outliers generated after the data was binned. Hence, this portion of decoding errors is due to noisy data recording that was not completely attenuated by an online noise abatement method. It is reassuring to see that the decoders used in these two sessions have been producing this result very infrequently. Because the keyboard is set to only accept one decoded command per trial, several of these errant decodes can be excluded as they occur after the first correct or incorrect decode is sent to the keyboard. As a result, roughly only one trial in sessions 10 and 11 would've been considered an error were it not for the constraints placed on the keyboard accepting a specific set of commands at specific times. More testing will be required to see if this will hold up when those constraints are removed entirely.

All of the closed loop sessions and their accuracies can be examined to determine the maximum accuracy of each gesture class, to see what areas of improvement may exist for future decoding methods. Sessions 10 and 11 both show decoding accuracies for the row switch gestures at above 95%, for now the maximum accuracies of all finger classes will be considered, which are the ones actively used in character selection during typing.

The right thumb, right pinky, and right index fingers all had a peak decoding accuracy above 90%, with the other two fingers on the right hand coming close to 90%. As for the left hand a broader distribution of maximum accuracies can be seen, the left pinky finger performing the best followed by the left thumb, the three middle fingers falling below 85% and as low as 74.4% for the left index finger. Overall, this falls within expectations that for an iBCI collecting signals from the hand-knob area of the left PCG higher decoding accuracies from the contralateral hand than the ipsilateral hand can be seen. And this assessment extends to the decoding accuracies of the flexion and extension of the contralateral wrist. In the neural data there is enough information about the contralateral wrist such that decoders have a relatively easy time decoding the attempted movement of the wrist in either direction.

Array Contributions to Neural Decoding

As described previously, participant T11 has two microelectrode arrays placed in left PCG. One array (Medial) lies closer to the midline than the other array (Lateral). Both arrays are providing the same features (ncTX, Spike Power, both described in Methods), but because of their implant sites, they may not be contributing the same information to the decoder, and likewise the decoder may not be using all the features available.

Local Field Potentials of Finger Presses

By looking at Local Field Potentials for each electrode on each array in a single block of a 10-digit decoding task, both arrays contain power at lower frequencies between 0.1 and 4 Hz. These low frequency LFPs have been shown to contain important information about movement. On both arrays there is a slight peak around 9 Hz. An additional peak was observed in the beta frequency range (~15 Hz-25 Hz) of the lateral array.

Characterizing the LDA Subspace

The goal of using LDA in the decoder pipeline, as mentioned previously, is to project the neural data to a lower-dimensional subspace where the variance between classes is high while the variance within each class is low. By plotting the top dimensions to gain some understanding about the separability and uniqueness of each class when attributed to the neural features. First, the projected neural data during the session days which only tested ten-finger typing with automated row switching can be visualized. With a decoder built using 10 digit classes it can be seen how well LDA is able to separate the neural data for each attempted finger press on both hands. Likewise, a similar 3D projection can be made with decoders taking in attempted finger presses and the flexion and extension of the right wrist, allowing to see how separate finger and wrist gestures can be from each other.

Across both sets of gesture classes (fingers, fingers+right wrist), clusters form around a centroid for each class. Opposite fingers have overlap with each other, but there may be cases in which their centroids are far apart when considering the left and right thumbs. In general, different clusters of overlapping opposite pairs of finger groups were observed. As these projections are used to train decoders, which gestures are likely to be decoded well given their separation to other classes can be identified. What's reassuring is that both wrist classes are separate from the 10 finger gesture classes and they form their own cluster.

Exploratory Independent Component Analysis (ICA) of Low Frequency Local Field Potentials of Finger Presses A point of interest in developing communication methods, whether it's speech or typing, is to determine how to best align neural data to behavioral task markers, such that future applications can allow for un-cued typing without sweeping for specific windows of activity. Looking at one block of Closed Loop Task 1 (Single Row Random Typing), the following differences exist in average PSDs presents a significant peak close to 1 Hz between pre-cue and post-cue. This indicates that in this frequency band [0.1 Hz-4 Hz] there is a result in the participant attempting to move his fingers after the cue.

Above, PSDs for various peaks in power of neural features during the whole typing task were examined. Here, the spectral content associated with specific events in the typing task with the goal of identifying spectral features related to task-relevant events was specifically analyzed. After performing ICA on the identified frequency band, examining the ICs with the highest number of peaks visually can reveal how close the IC is in time to either a cue onset or movement onset, at least one IC was tied to either or both. As participant T11 was unable to move his fingers, there is no external marker of movement occurring other than a Closed Loop trial finishing due to a decoded finger press. If an Independent Component (IC) has a consistent change in amplitude around the cue onset for each trial, it's possible that this independent component is specifically tied to the cue onset. Likewise, an IC that has a large change in amplitude located within a standard deviation of the average trial response time, that component may be tied to a movement onset signal. What previous studies have noted is that the ICs derived from the unmixing matrix of one instance can be applied to similar data from another instance, and the ICs will remain largely the same.

From the above description, those skilled in the art will perceive improvements, changes, and modifications. Such improvements, changes and modifications are within the skill of one in the art and are intended to be covered by the appended claims. All patents, patent applications, and publications cited herein are incorporated by reference in their entirety.

What is claimed is:

1. A system comprising:

a neural decoding system comprising a non-transitory memory storing instructions and a processor to execute the instructions to:

receive at least one neural signal of a user from at least one neural recording device, identify that the at least one neural signal of the user is representative of the user at least thinking of attempting to perform a gesture, wherein the gesture is one of a plurality of known gestures mapped to a plurality of commands, and output a command of the plurality of commands based on the gesture, wherein the gesture is mapped to the command; and a controller in communication with the neural decoding system and a display configured to visualize a depiction of one or more selectable groups of elements, wherein each of the one or more selectable groups comprises one or more selectable elements, wherein the controller comprises another non-transitory memory storing instructions, and another processor to execute the instructions to:

receive the command associated with the gesture from the neural decoding system, determine if the gesture is a primary gesture or a secondary gesture, when the gesture is a primary gesture select a group of the one or more selectable groups of elements to be an active group of selectable elements, when the gesture is a secondary gesture select an element of the active group of selectable elements, wherein the secondary gesture is different from the primary gesture and occurs at a time after a primary gesture has been detected, and output a response indicative of the active group of selectable elements being activated and/or the element of the active group of selectable elements being selected.

2. The system of claim 1, wherein the group of selectable elements comprises ten elements or less, wherein each of the ten elements or less is linked to a gesture of one of ten digits of two hands of the user.

3. The system of claim 1, wherein:

the depiction is a keyboard;

the one or more selectable groups of elements comprises one or more rows and/or columns of the keyboard; and the one or more selectable elements are one or more keys in the one or more rows and/or columns, wherein the response comprises displaying a letter, a number, a punctuation mark, a functional key, or a space.

4. The system of claim 3, wherein:

when the gesture is the primary gesture, then select the row or the column of the one or more rows and/or columns to be an active row or an active column, when the gesture is a secondary gesture, then select the key of the active row or the active column, wherein the second gesture is related to a motion of a digit of a hand of the user to press the key in the active row and/or the active column.

5. A system comprising:

a neural decoding system comprising a non-transitory memory storing instructions and a processor to execute the instructions to:

receive at least one neural signal of a user from at least one neural recording device, identify that the at least one neural signal of the user is representative of the user at least thinking of attempting to perform a gesture, wherein the gesture is one of a plurality of known gestures mapped to a plurality of commands, and output a command of the plurality of commands based on the gesture, wherein the gesture is mapped to the command; and a controller in communication with the neural decoding system and a display configured to visualize a depiction of one or more groups of elements, wherein each of the one or more groups comprises one or more elements, wherein the depiction is a virtual instrument, the one or more groups of one or more elements are one or more octaves playable with the virtual instrument, and the one or more elements are one or more keys associated with one or more notes of the virtual instrument in a selected octave; and wherein the controller comprises another non-transitory memory storing instructions, and another processor to execute the instructions to:

receive the command associated with the gesture from the neural decoding system, if the gesture is a primary gesture, then the command associated with the primary gesture selects a group of the one or more groups of elements to be an active group of elements, if the gesture is a secondary gesture, then the command associated with the secondary gesture at least selects an element of the active group of elements, wherein the secondary gesture is different from the primary gesture, and output a response indicative of the active group of elements being activated and/or the element of the active group of elements being selected, wherein the response comprises playing an audible musical note.

6. The system of claim 1, wherein the depiction arranges the one or more selectable groups of elements in a linear arrangement and/or a radial arrangement.

7. The system of claim 1, wherein:

the depiction is a menu of options the one or more selectable groups of elements are one or more groups of one or more options; and the one or more selectable elements are the one or more options.

8. The system of claim 7, further comprising one or more sub elements selectable from the one or more selectable elements, wherein the one or more sub elements are one or more secondary options.

9. The system of claim 1, wherein the gesture is a simple movement, a combination of movements, and/or a posture.

10. The system of claim 1, wherein the gesture is a motion of at least a portion of a finger, at least a portion of a hand, at least a portion of an arm, at least a portion of a head, at least a portion of a leg, and/or at least a portion of a foot.

11. The system of claim 1, wherein only one element of the active group is active at a given time.

12. The system of claim 1, wherein the processor further executes the instructions to:

identify another gesture that instructs the controller to activate the depiction, wherein the visualization of the depiction is provided on the display; and identify a further gesture that instructs the controller to deactivate the depiction, wherein the visualization of the depiction is removed from the display.

13. The system of claim 1, wherein each of the one or more selectable elements represents a letter, a number, a punctuation mark, a space, a computer function, or a musical note.

14. A method comprising:

visualizing, by a system comprising a processor, on a display device a depiction of one or more selectable groups of elements, wherein each of the one or more selectable groups comprises one or more selectable elements;

receiving, by the system, a command from a neural decoding system, wherein the command is based on the neural decoding system identifying at least one neural signal of the user that is representative of the user at least thinking of attempting to perform a gesture;

determining if the gesture is a primary gesture or a secondary gesture;

when the gesture is the primary gesture, selecting, by the system, a group of the one or more selectable groups of elements to be an active group of elements;

when the gesture is a secondary gesture, selecting, by the system, an element of the active group of elements, wherein the secondary gesture is different from the primary gesture, and outputting, by the system, a response indicative of the active group of elements being activated and/or the element of the active group of elements being selected.

15. The method of claim 14, further comprising:

receiving, by the neural decoding system, the at least one neural signal of the user from the at least one neural recording device, identifying, by the neural decoding system, that the at least one neural signal of the user is representative of the user at least thinking of attempting to perform the gesture, wherein the gesture is one of a plurality of known gestures mapped to a plurality of commands, and outputting, by the neural decoding system, the command of the plurality of commands to the system based on the gesture, wherein the gesture is mapped to the command, wherein the neural decoding system comprises another processor.

16. The method of claim 15, wherein the gesture is a simple movement, a combination of movements, and/or a posture.

17. The method of claim 15, wherein the gesture is a motion of at least a portion of a finger, at least a portion of a hand, at least a portion of an arm, at least a portion of a head, at least a portion of a leg, and/or at least a portion of a foot.

18. The method of claim 14, wherein each of the one or more selectable elements represents a letter, a number, a punctuation mark, a space, a computer function, or a musical note and the output response is a visualization of the letter, the number, the punction mark, or the space, the action of the computer function, or the audible musical note, respectively.

19. The method of claim 14, wherein the group of elements comprises ten elements or less, wherein each of the ten elements or less is linked to a gesture of one of ten digits of a hand of the user.

20. The method of claim 14, further comprising:

identifying, by the neural decoding system, another gesture activates the depiction, wherein the visualization of the depiction is provided on the display by the system comprising the processor; and identifying, by the neural decoding system, a further gesture that instructs the controller to deactivate the depiction, wherein the visualization of the depiction is removed from the display by the system comprising the processor.

* * * * *